United States Patent
Feng et al.

(10) Patent No.: US 9,003,360 B1
(45) Date of Patent: Apr. 7, 2015

(54) CONFIGURING ATTRIBUTES USING CONFIGURATION SUBGRAPHS

(75) Inventors: Haihua Feng, Sherborn, MA (US); John Edward Ciolfi, Wellesley, MA (US); Ricardo Monteiro, Brookline, MA (US); Ramamurthy Mani, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 542 days.

(21) Appl. No.: 12/940,239

(22) Filed: Nov. 5, 2010

Related U.S. Application Data

(60) Provisional application No. 61/285,444, filed on Dec. 10, 2009.

(51) Int. Cl.
*G06F 9/44* (2006.01)

(52) U.S. Cl.
CPC ... *G06F 8/34* (2013.01); *G06F 8/35* (2013.01)

(58) Field of Classification Search
CPC ............................................... G06F 8/34–8/35
USPC .......... 717/104–106; 703/1–22; 715/200–970
See application file for complete search history.

(56) References Cited

U.S. PATENT DOCUMENTS

| | | | | |
|---|---|---|---|---|
| 5,481,740 | A * | 1/1996 | Kodosky | 715/839 |
| 5,734,863 | A * | 3/1998 | Kodosky et al. | 703/27 |
| 5,933,644 | A * | 8/1999 | Wallace | 717/156 |
| 6,256,648 | B1 * | 7/2001 | Hill et al. | 715/234 |
| 6,259,448 | B1 * | 7/2001 | McNally et al. | 715/733 |
| 7,133,883 | B2 * | 11/2006 | Talagala et al. | 1/1 |
| 7,472,132 | B2 * | 12/2008 | Ho et al. | 1/1 |
| 7,506,304 | B2 * | 3/2009 | Morrow et al. | 717/109 |
| 7,610,256 | B1 * | 10/2009 | Yang | 706/52 |
| 7,734,455 | B1 * | 6/2010 | Aldrich | 703/6 |
| 7,801,715 | B2 * | 9/2010 | Ciolfi et al. | 703/13 |
| 7,941,299 | B1 * | 5/2011 | Aldrich et al. | 703/1 |
| 7,974,825 | B2 * | 7/2011 | Linebarger et al. | 703/13 |
| 8,019,579 | B1 * | 9/2011 | Wey et al. | 703/6 |
| 8,046,751 | B1 * | 10/2011 | Avadhanula et al. | 717/156 |
| 8,131,528 | B1 * | 3/2012 | Vora et al. | 703/19 |
| 8,135,570 | B2 * | 3/2012 | Linebarger et al. | 703/13 |
| 8,146,053 | B2 * | 3/2012 | Morrow et al. | 717/109 |
| 2002/0154175 | A1 * | 10/2002 | Abello et al. | 345/853 |
| 2004/0083453 | A1 * | 4/2004 | Knight et al. | 717/113 |

(Continued)

OTHER PUBLICATIONS

A graph-based factor screening method for synchronous data flow simulation models—Rochester Institute of Technology RIT Scholar Works—Gregory Tauer—May 1, 2009.*

(Continued)

*Primary Examiner* — Lewis A Bullock, Jr.
*Assistant Examiner* — Francisco Aponte
(74) *Attorney, Agent, or Firm* — Nelson Mullins Riley & Scarborough LLP

(57) ABSTRACT

In an embodiment, a specification of a configuration subgraph is received. The configuration subgraph may graphically specify an attribute for an element in a block diagram model. A relationship may be established between the configuration subgraph and the element. The configuration subgraph may be evaluated to produce a result. The result may be used to configure the attribute of the element during or prior to a compilation of a dynamic portion of the block diagram model. The configuration subgraph may not be used during an execution of the dynamic portion of the block diagram model.

19 Claims, 19 Drawing Sheets

(56) References Cited

U.S. PATENT DOCUMENTS

| | | | |
|---|---|---|---|
| 2004/0133539 A1* | 7/2004 | Talagala et al. | 707/1 |
| 2005/0216248 A1* | 9/2005 | Ciolfi et al. | 703/22 |
| 2005/0251785 A1* | 11/2005 | Vertes et al. | 717/105 |
| 2005/0273773 A1* | 12/2005 | Gold et al. | 717/139 |
| 2006/0064670 A1* | 3/2006 | Linebarger et al. | 717/106 |
| 2007/0157138 A1* | 7/2007 | Ciolfi et al. | 716/4 |
| 2007/0157162 A1* | 7/2007 | Ciolfi | 717/105 |
| 2007/0220235 A1* | 9/2007 | Yehia et al. | 712/205 |
| 2007/0250299 A1* | 10/2007 | Paxson et al. | 703/11 |
| 2008/0059739 A1* | 3/2008 | Ciolfi et al. | 711/162 |
| 2008/0140358 A1* | 6/2008 | Lang et al. | 703/1 |
| 2008/0201688 A1* | 8/2008 | Centonze et al. | 717/104 |
| 2008/0263332 A1* | 10/2008 | Yehia et al. | 712/220 |
| 2008/0288915 A1* | 11/2008 | Krablin et al. | 717/104 |
| 2009/0132993 A1* | 5/2009 | Mani et al. | 717/105 |

OTHER PUBLICATIONS

Mosterman, Pieter, J., "HyBrSim—A Modeling and Simulation Environment for Hybrid Bond Graphs," Journal of Systems and Control Engineering, pp. 1-21 (2000).

\* cited by examiner

CONFIGURING ATTRIBUTES USING CONFIGURATION SUBGRAPHS

RELATED APPLICATIONS

This Application claims priority to U.S. Patent Application No. 61/285,444, titled ATTRIBUTES COMPUTATION IN GRAPHICAL MODELING USING CONFIGURATION SUBGRAPHS, which was filed on Dec. 10, 2009 and which is incorporated herein by reference.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

Figure 1:
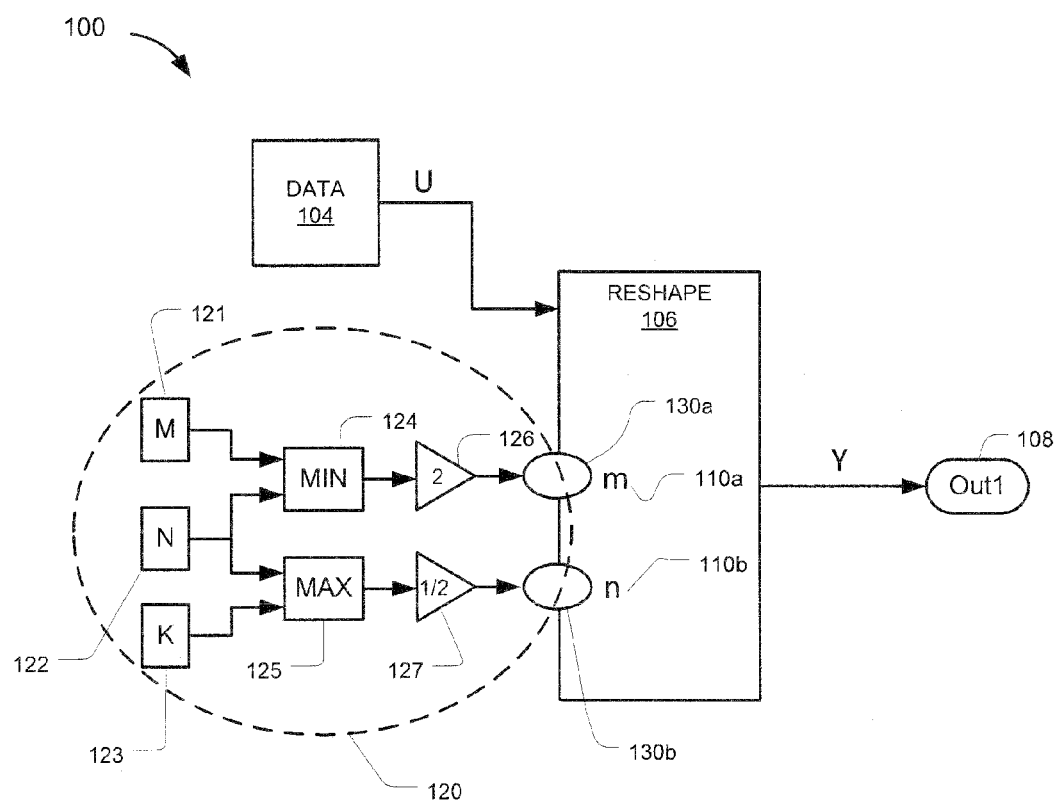
FIG. 1 illustrates an example of a block diagram model with a configuration subgraph that may be used to configure one or more attributes for a reshape block.

One or more embodiments of the invention may be discussed in connection with one or more block diagram models that may be created, compiled, and/or executed in the Simulink® modeling environment (hereinafter "Simulink"), which is available from MathWorks, Inc., Natick, Mass. It should be noted, however, that other technical computing environments (TCEs) may be used with one or more embodiments of the invention.

A model may contain one or more elements (e.g., blocks, signals). An attribute may be associated with an element contained in the model. An attribute, associated with an element, may be configured using, for example, a configuration subgraph connected to the model via a specialized port, such as an attribute port. Configuring the attribute may include, for example, establishing the attribute and/or identifying the attribute.

For example, a block in a block diagram model may generate and output a signal that is a constant. An attribute of the signal may be a data type associated with the signal. A configuration subgraph may be used to configure the data type of the signal that is output by the block. Here, configuring may involve identifying a data type for the signal and establishing the data type of the signal based on the identified data type.

A configuration subgraph may include one or more entities that may be used to configure one or more attributes associated with a model. These entities may be graphical entities and may include one or more graphical elements (e.g., graphical blocks), connectors (e.g. lines), and/or other graphical entities. Using graphical entities to configure attributes may be said to "graphically specify" the attributes.

A model may contain (1) one or more blocks that represent dynamics of a system being modeled and (2) one or more entities that represent a configuration subgraph. The one or more blocks that represent dynamics of a system being modeled may be referred to as a dynamic portion of the model. The one or more entities that represent the configuration subgraph may be referred to as a configuration subgraph portion of the model. A configuration subgraph portion of a model may be used to configure one or more attributes associated with a dynamic portion of the model.

A configuration subgraph associated with a model may be created, for example, by a user and may be evaluated (e.g., executed) prior to or during a compilation of a dynamic portion of the model. Moreover, a configuration subgraph associated with a model may be evaluated prior to an execution (e.g., run-time execution) of a dynamic portion of the model. Here, the configuration subgraph may not be used (e.g., evaluated) during the execution of the dynamic portion of the model.

One or more results of an evaluation of a configuration subgraph may be used to configure one or more attributes associated with one or more elements of the dynamic portion. Configuring an attribute may include establishing the attribute. Establishing the attribute may include associating the attribute with an element in the dynamic portion.

For example, a configuration subgraph may be used to establish an attribute associated with a signal that may be output from a block in a dynamic portion of a model. The attribute may be a data type of the signal. The configuration subgraph may be evaluated, for example, prior to a compilation of the dynamic portion, to identify the data type of the signal. A result of the evaluation may be used to establish the data type of the signal prior to the compilation of the dynamic portion.

Note that, configured attributes may affect an executable version of a model that may be generated during a compilation of the model. The configured attributes may remain unchanged during an execution of the executable version of the model. For example, in the above example, the data type of the signal, in the dynamic portion of the model, may be established using the configuration subgraph. The dynamic portion of the model may be compiled and linked and executable code may be generated from the compiled and linked dynamic portion. The executable code may be executed and the data type of the signal output from the block may be of a data type that was configured by the configuration subgraph.

FIG. 1 illustrates an example block diagram model 100 containing a configuration subgraph 120 that may be used to configure one or more attributes for a reshape block 106 in a dynamic portion of the block diagram model 100. Referring to FIG. 1, the configuration subgraph 120 is enclosed in a dotted line. The dynamic portion of the block diagram model 100 includes data block 104, reshape block 106, and output port (outport) block 108.

Reshape block 106 may be used, for example, to reshape a signal "U", that may be output by data block 104, into a signal "Y" that may be output from the block diagram model 100 via outport block 108. Reshaping may involve, for example, changing a number of dimensions associated with signal "U". For example, signal "U" may be in a "4×2" array format and signal "Y" may be in an "8×2" array format. Reshape block 106 may be used to reshape the "4×2" array format of signal "U" to the "8×2" array format of signal "Y".

Reshape block 106 may be associated with two attributes m 110*a* and n 110*b* that may be used to specify a number of rows and columns, respectively, for signal "Y". For example, in the above example, m 110*a* may be specified as "8" and n 110*b* may be specified as "2" to a make the array format for signal "Y" an "8×2" array. The attributes 110*a-b* may be configured using configuration subgraph 120. The attributes may be configured prior to a compilation and/or execution of the dynamic portion of the block diagram model 100. Configuration subgraph 120 may be executed to configure the attributes.

Configuration subgraph 120 may include blocks 121 through 127. Blocks 121, 122, and 123 may generate values M, N, and K, respectively. The values M, N, and K may be numeric values. Block 124 may be used to inspect the generated M and N values and output a minimum value from the generated M and N values. Likewise, block 125 may be used inspect the generated N and K values and output a maximum value from the generated N and K values. Gain block 126 may multiply the minimum value outputted by block 124 by "2" and gain block 127 may multiply the maximum value outputted by block 125 by "½".

An attribute port 130*a* may be used to indicate that an attribute associated with an element in the dynamic portion of the model 100 may be configured using the configuration subgraph 120. Specifically, attribute port 130*a* may be used to indicate that attribute m 110*a* may be configured using an output of block 126 in configuration subgraph 120. Likewise, for example, attribute port 130*b* may be used to indicate that attribute n 110*b* may be configured using an output of block 127 in configuration subgraph 120.

Figure 2:
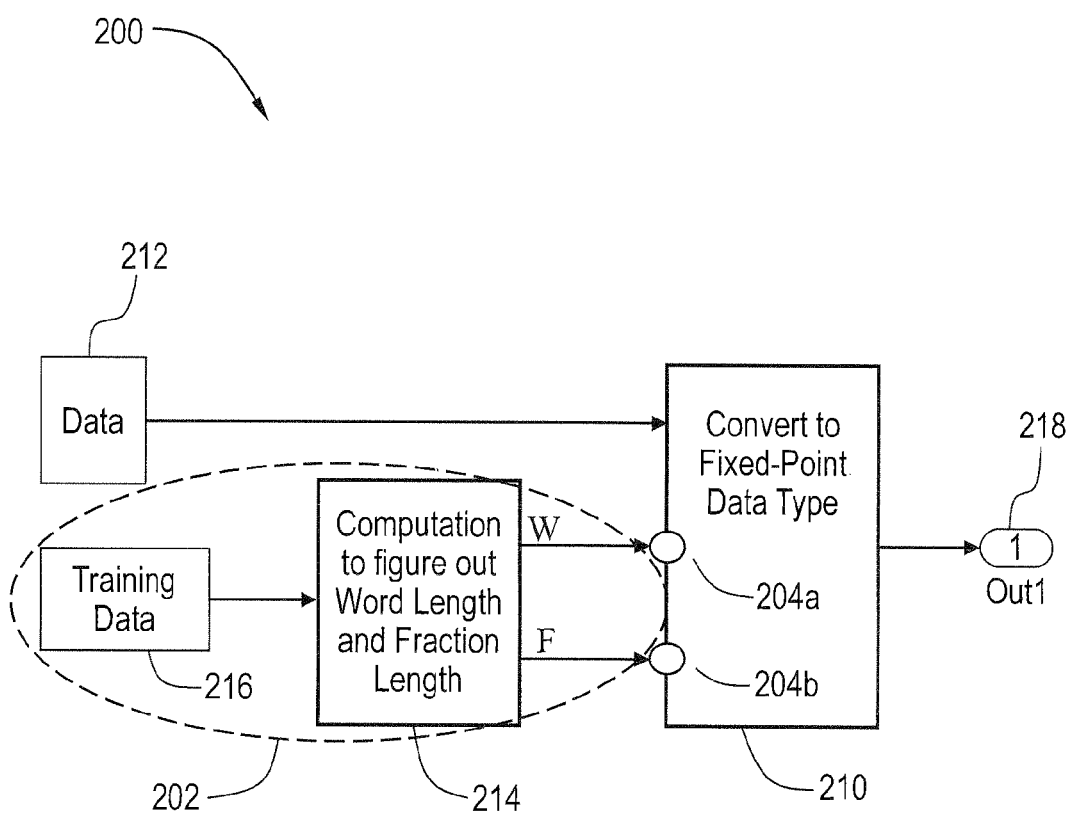
FIG. 2 illustrates an example of a block diagram model with a configuration subgraph that may be used to configure one or more attributes associated with a convert to fixed-point data type block.

FIG. 2 illustrates an example of a block diagram model 200 with a configuration subgraph 202 that may be used to configure one or more attributes associated with a convert to fixed-point data type block 210. Referring to FIG. 2, a dynamic portion of the block diagram model 200 may include blocks 210, 212, and 218. Block 212 may output data which may be received by block 210. Block 210 may convert the data received from block 212 to data that is of a fixed point data type and block 218 may output the converted data.

Data that is of a fixed-point data type may have various attributes. The attributes may include, for example, a length of a word portion of the data (word length) and a length of a fraction portion of the data (fraction length). For data that is output by block 210, these attributes may be defined by attributes W and F. Specifically, attribute W may define a word length of fixed point data that is output by block 210 and attribute F may define a fraction length of fixed point data that may be output from block 210. W and F may be configured using configuration subgraph 202. Configuring W and F may involve, for example, establishing these attributes.

For example, subgraph 202 may include a subsystem block 214 that may be used to compute values for attributes W and F from data provided by training data block 216. Specifically, training data block 216 may output one or more values that are received by subsystem block 214. Subsystem block 214 may (1) compute values for attributes W and F based on the one or more values that were received from training block 216 and (2) output the computed values. The computed values output from block 214 may be used to establish values of attributes W and F in the dynamic portion of the block diagram model 200.

Note that the configuration of W and F by configuration subgraph 202 may occur prior to a compilation of the dynamic portion. For example, prior to a compilation of the dynamic portion, configuration subgraph 202 may be converted to an executable representation. The executable representation of subgraph 202 may be executed to establish the values for W and F. The values of W and F may be used when producing and/or modifying an executable representation of the dynamic portion.

A configuration subgraph may be subject to one or more of the following conditions: (1) may not be part of a dynamic portion of a model, (2) may not be used to establish one or more attributes for the dynamic portion of the model during a run-time execution of the model, and (3) may be used to establish one or more attributes associated with the dynamic portion of the model prior to or during a compilation of the dynamic portion of the model. Note that the run-time execution of the model may include (1) an execution of code generated from the dynamic portion of the model and/or (2) a simulation of the dynamic portion of the model. Also note that a configuration subgraph may be subject to other conditions.

A configuration subgraph may be presented (e.g., displayed) in such a way so as to indicate some or all of the above conditions. For example, a configuration subgraph of a block diagram model may be displayed in a manner that is different than a dynamic portion of the block diagram model to indicate the configuration subgraph is subject to some or all of the above conditions. Examples of displaying a configuration subgraph differently than a dynamic portion of a block diagram model may include graying out the configuration subgraph and not graying out the dynamic portion of the block diagram model, displaying the configuration subgraph in an area of a screen that is different than the dynamic portion of the block diagram model, and/or displaying the configuration subgraph in a color that is different than dynamic portion of the block diagram model.

Note that other ways of indicating some or all of the above conditions may be used. For example, a configuration subgraph may be displayed when editing and/or compiling a dynamic portion of a block diagram model and may be hidden during an execution of the dynamic portion of the block diagram model.

Figure 3A:
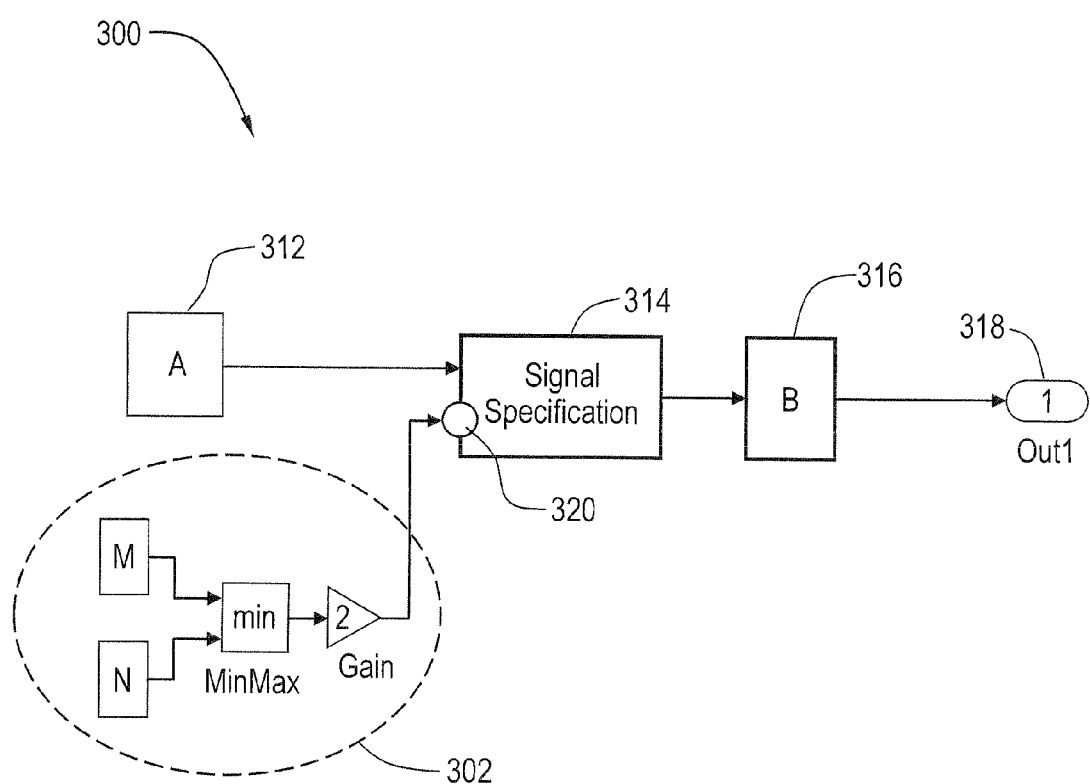
FIG. 3A illustrates an example of a block diagram model with a configuration subgraph that may be used to configure an attribute associated with a signal specification block.

FIG. 3A illustrates a block diagram model 300 that includes a dynamic portion and a configuration subgraph 302. The dynamic portion includes a first block 312, a signal specification block 314, a second block 316, and an outport block 318. Referring to FIG. 3A, during a run-time execution of the dynamic portion of the block diagram model 300, the signal specification block 314 may check a signal that may be outputted from the first block 312 to ensure that the signal has certain signal attributes (e.g., the signal is an array with a certain number of dimensions). If so, the signal specification block 314 may output the signal to the second block 316 unchanged. Otherwise, run-time execution may be halted and an error message may be displayed.

Configuration subgraph 302 may be used to configure an attribute that is checked by the signal specification block 314. The attribute may be configured based on a value that may be outputted by the configuration subgraph 302. Specifically, the value outputted by the configuration subgraph 302 may be inputted into block 314 via attribute port 320. Block 314 may use the inputted value to identify an attribute that block 314 checks for in the signal that is inputted into block 314 from block 312.

Figure 3B:
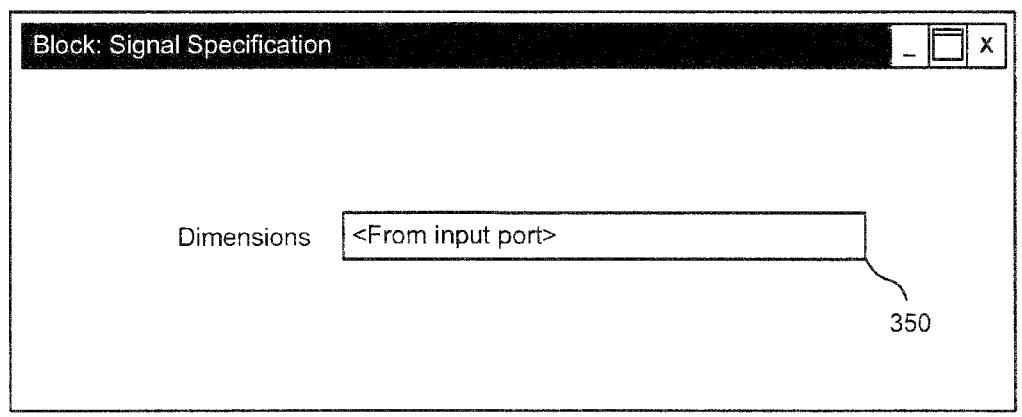
FIG. 3B illustrates a dialog box that may be used to specify that an attribute associated with a signal specification block may be configured using a configuration subgraph.

FIG. 3B illustrates an example of a configuration dialog box 340 that may be used to specify that the configuration subgraph 302 is used to establish a dimension attribute associated with block 314. The dimension attribute may be used by block 314 to determine if the signal, that is inputted into block 314 from block 312, is an array that has a certain number of dimensions. Referring to FIG. 3B, specifying the text "<From input port>" in text box 350 may be used to indicate that the dimension attribute may be established using the configuration subgraph 302.

A model may be hierarchically arranged. Likewise, attributes associated with elements at various levels may be hierarchically arranged. For example, a block diagram model may contain a subsystem that includes one or more elements that may be located at one or more levels below a top level of the block diagram model. An attribute associated with an element at a top level of the block diagram model may be considered at a top level of the attribute hierarchy. Likewise, an attribute, associated with an element that may be at one level below the top level of the block diagram model, may be considered at one level below the top level of the attribute hierarchy.

Figure 4A:
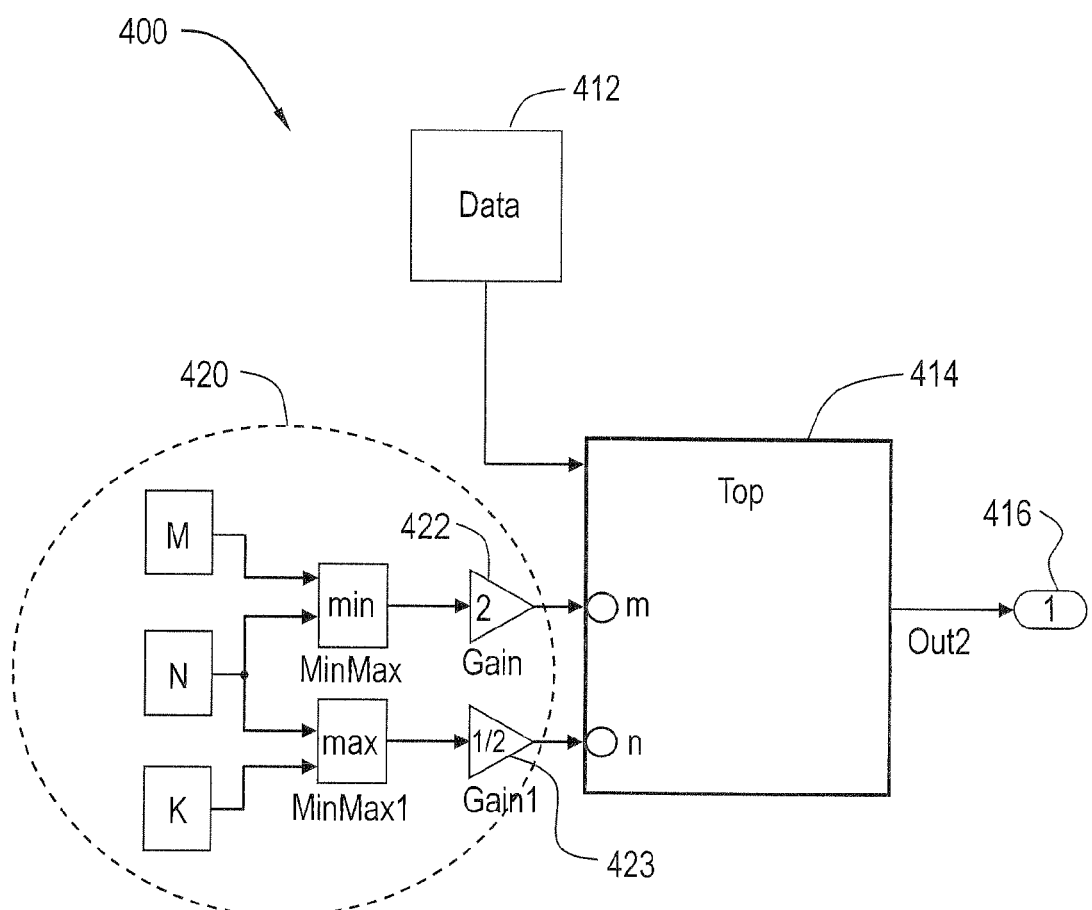
FIGS. 4A-B illustrate an example of a hierarchically arranged block diagram model with a configuration subgraph that may be used to configure one or more attributes in a hierarchy of attributes associated with the block diagram model.

A configuration subgraph may be used to configure one or more attributes at various levels of a hierarchy of attributes associated with a model. FIG. 4A illustrates an example of a block diagram model 400 that has two attributes m and n that are associated with an element that is at a level below a top level of the block diagram model.

Referring to FIG. 4A, the block diagram model 400 may include a dynamic portion and a configuration subgraph portion. The dynamic portion may include data block 412, subsystem block 414 (named "Top"), and outport block 416. The configuration portion may include a configuration subgraph 420. As will be described further below, the configuration subgraph 420 may be used to configure attributes m 432a and n 432b, which may be associated with an element in the dynamic portion.

Figure 4B:
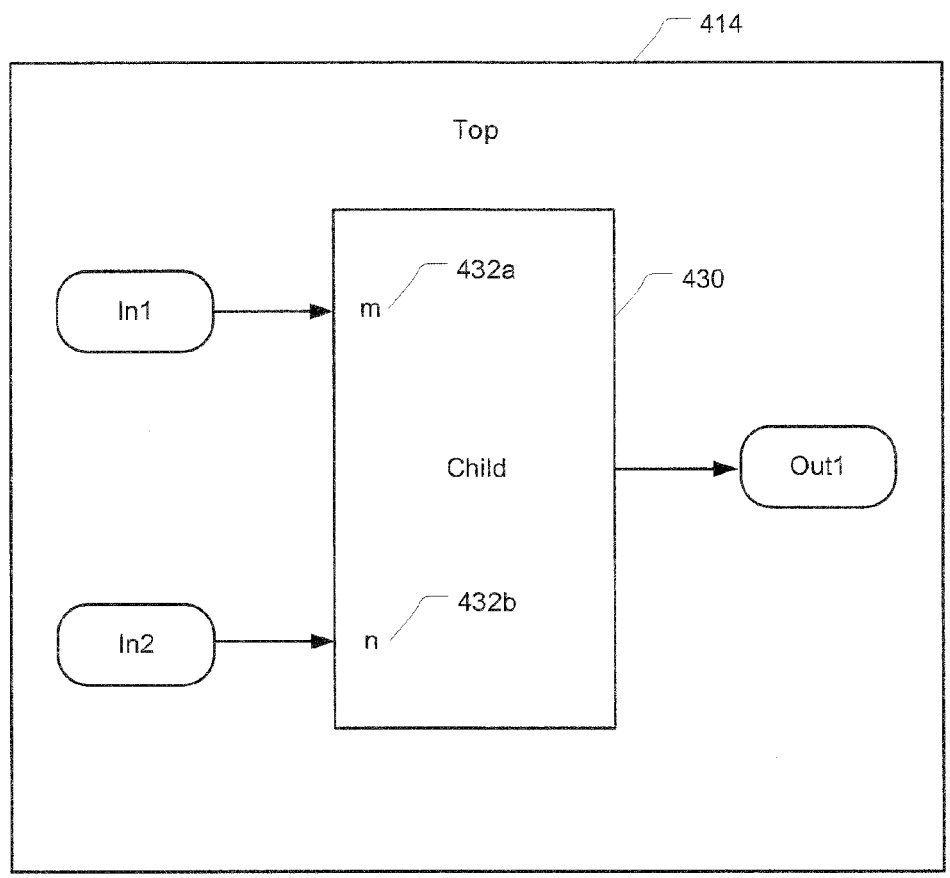

Referring now to FIGS. 4A and 4B, subsystem block 414 may include block 430 (named "Child"), which may be at one level below subsystem block 414 in a hierarchy of the block diagram model. Attribute m 432a and attribute n 432b may be associated with block 430. Thus, attributes 432a-b may be located at one level below attributes for subsystem block 414 in an attribute hierarchy for the block diagram model. These attributes 432a-b may be referred to from the top level of the attribute hierarchy as "Top.Child.m" and "Top.Child.n", respectively.

Attributes 432a-b may be configured using configuration subgraph 420. Specifically, an output from gain block 422, contained in configuration subgraph 420, may be used to configure attribute m 432a. Likewise, an output from gain block 423, also contained in configuration subgraph 420, may be used to configure attribute n 432b. Thus, configuration subgraph 420 may be used to configure one or more attributes that may be part of an attribute hierarchy.

A configuration subgraph may be used to configure attributes that may be associated with more than one element contained in a dynamic portion of a model. The attributes may be configured, for example, directly and/or through propagation. Direct configuring of the attributes may include visually, graphically, and/or semantically connecting one or more outputs of the configuration subgraph to more than one element in the dynamic portion. Configuring the attributes through propagation may include forward and/or backward propagation of the attributes. Configuring of the attributes may occur prior to a compilation and/or execution of the dynamic portion.

Figure 5:
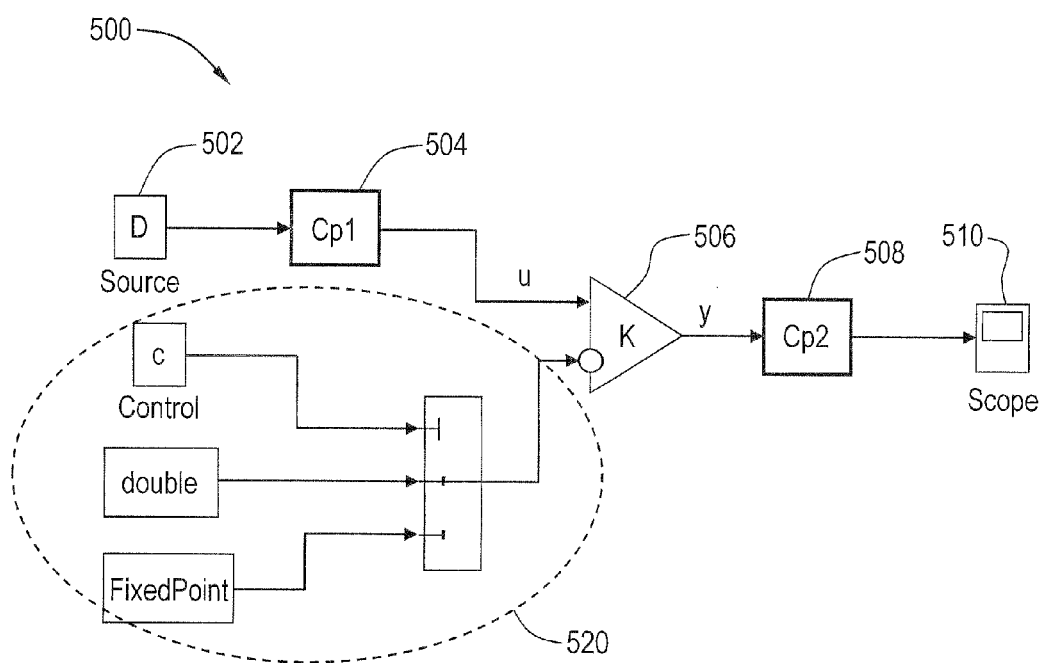
FIG. 5 illustrates an example of a block diagram model with a configuration subgraph that may be used to configure an attribute associated with an element in the model and where the configured attribute may be propagated to other elements in the model.

FIG. 5 illustrates an example of configuring attributes in a block diagram model 500 using a configuration subgraph and propagation. Referring to FIG. 5, a dynamic portion of the model 500 may include blocks 502, 504, 506, 508, and 510. A configuration portion of the model 500 may include configuration subgraph 520. The configuration subgraph 520 may be used to configure a data type for block 506. In this example, the chosen data type may be either "double" or "FixedPoint". The chosen data type may be back-propagated to block 504. Assuming block 504 is capable of handling the chosen data type, the data type may be adopted by block 504 as a data type attribute for a signal that may be, for example, output by block 504. In addition, block 504 may further back-propagate the chosen data type to block 502, where the chosen data type may be adopted as a data type attribute for a signal that may be, for example, output by the block 502. Note that if block 504 is not capable of handling the chosen data type, an error may be output.

Likewise, the chosen data type may be forward propagated to block 508. Assuming that block 508 is capable of handling the chosen data type, block 508 may adopt the chosen data type as a data attribute for a signal that may be output from and/or a signal that may be input into block 508. Note also that if block 508 is not capable of handling the chosen data type, an error may be output during.

A first configuration subgraph may have one or more entities that may have one or more attributes that may be configured by a second configuration subgraph. Here, the first and second configuration subgraphs may be arbitrarily nested. Hierarchical evaluation may be used to evaluate the nested configuration subgraphs. A result of the hierarchical evaluation may include the first or second configuration subgraph being evaluated at an evaluation of the other configuration subgraph. The other configuration subgraph may be evaluated, for example, prior to a compilation of a dynamic portion of a model. The dynamic portion may have one or more attributes that may established by the first and second configuration subgraphs.

A configuration subgraph may be subject to various prohibitions. For example, a configuration subgraph may be subject to a prohibition that indicates the configuration subgraph may not have a dependency on an element of a dynamic portion of a model. This prohibition may be imposed, for example, to ensure that the configuration subgraph may be properly evaluated.

Figure 6:
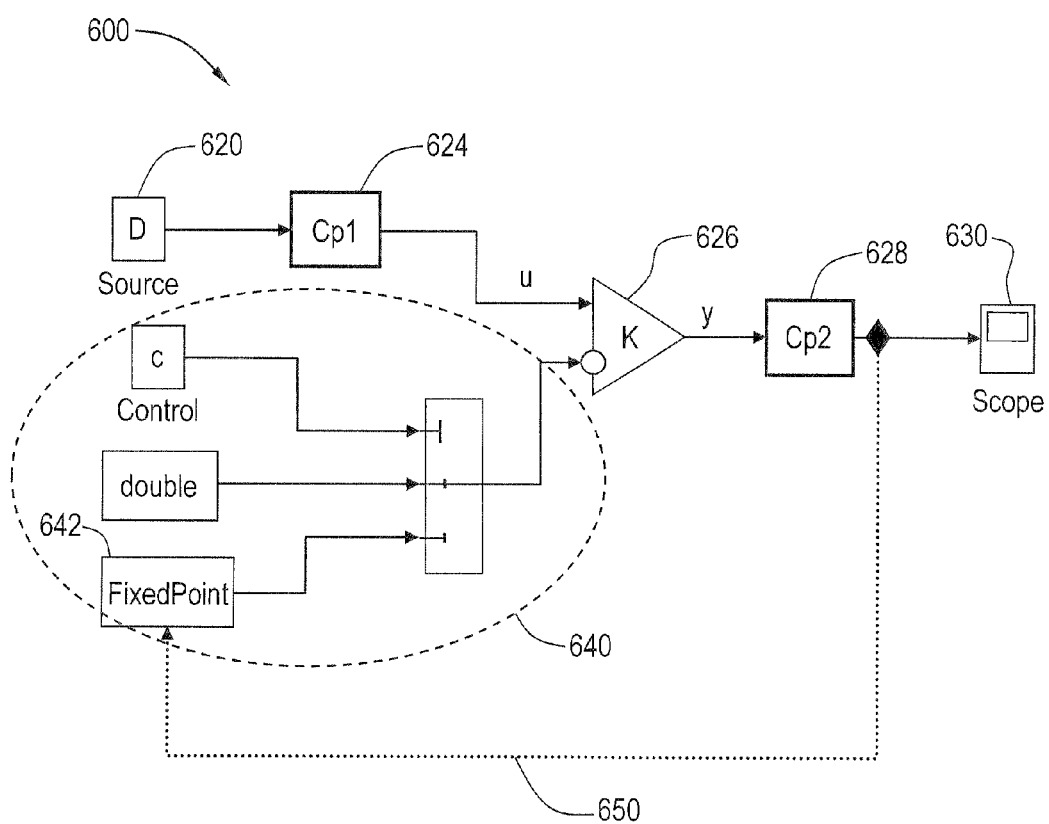
FIG. 6 illustrates an example of a block diagram model with a configuration subgraph that contains a dependency that may violate a prohibition on such dependencies and may produce an error condition.

For example, FIG. 6 illustrates an example of a block diagram model 600 that includes an arrangement where a block in a configuration subgraph is dependent on a signal that outputted by a block in a dynamic portion of the block diagram model 600. Referring to FIG. 6, the dynamic portion includes blocks 620, 624, 626, 628, and 630. Configuration subgraph 640 may be used to configure a data type attribute for block 626. The data type attribute may be configured to, for example, "double" or "Fixed Point". Note that block 642 is part of the configuration subgraph 640. Also note that block 628 outputs a signal 650 that is input into block 642. In other words, block 642 is dependent on a signal that is output from the dynamic portion of the block diagram model 600. This dependency may be disallowed based upon the above-described prohibition. Enforcing this prohibition may cause an error condition to be reported.

Figure 7:
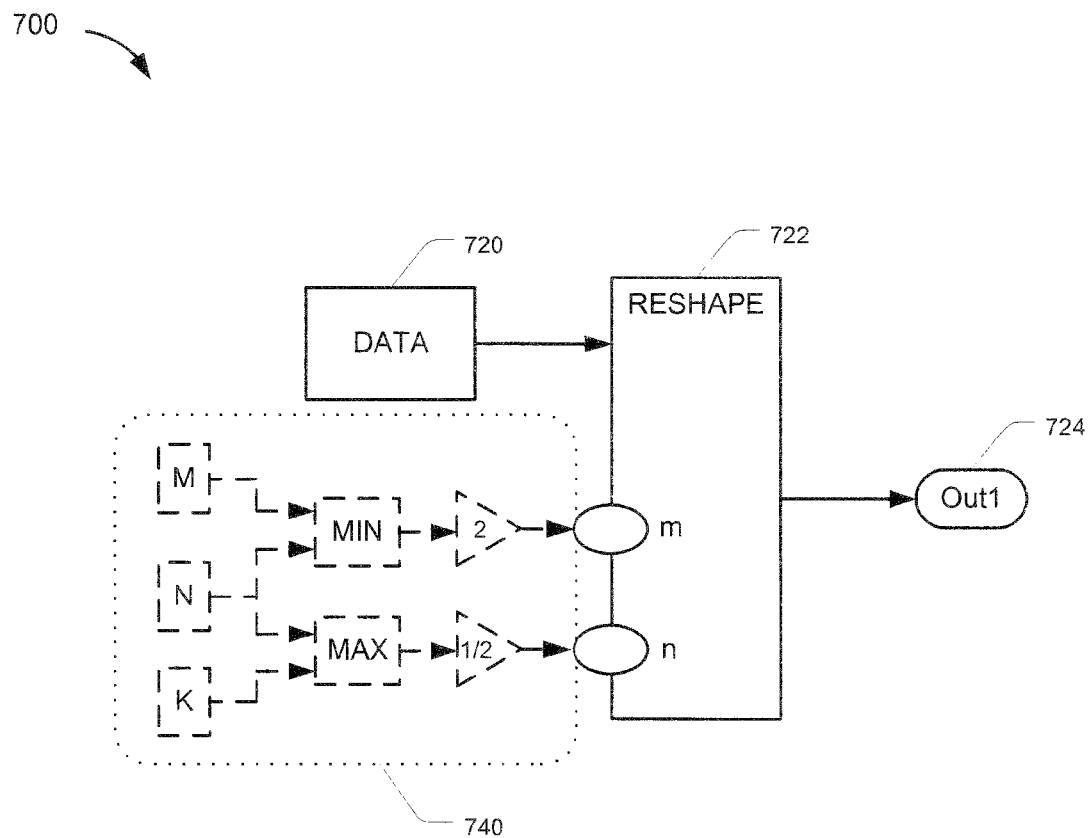
FIG. 7 illustrates an example of displaying a configuration subgraph, associated with a block diagram model, to indicate that the configuration subgraph is not executed and/or compiled when a dynamic portion of the block diagram model is executed and/or compiled.

Various affordances may be used to show that certain blocks, that may be part of a configuration subgraph portion of a model, may or may not be executed and/or compiled when a dynamic portion of the model is executed and/or compiled. For example, FIG. 7 illustrates a block diagram model 700 having a configuration subgraph portion and a dynamic portion. The dynamic portion includes blocks 720, 722, and 724. The configuration subgraph portion includes the configuration subgraph 740. Note that blocks included in the configuration subgraph 740 are presented differently than blocks 720, 722, and 724. This difference in presentation may be made to show that the blocks in the configuration subgraph 740, for example, are not executed and/or compiled when blocks in the dynamic portion are executed and/or compiled. It should be noted that blocks that may or may not be executed and/or compiled during a compilation and/or execution of a dynamic portion of a model may also be annotated with various graphical affordances.

Figure 8:
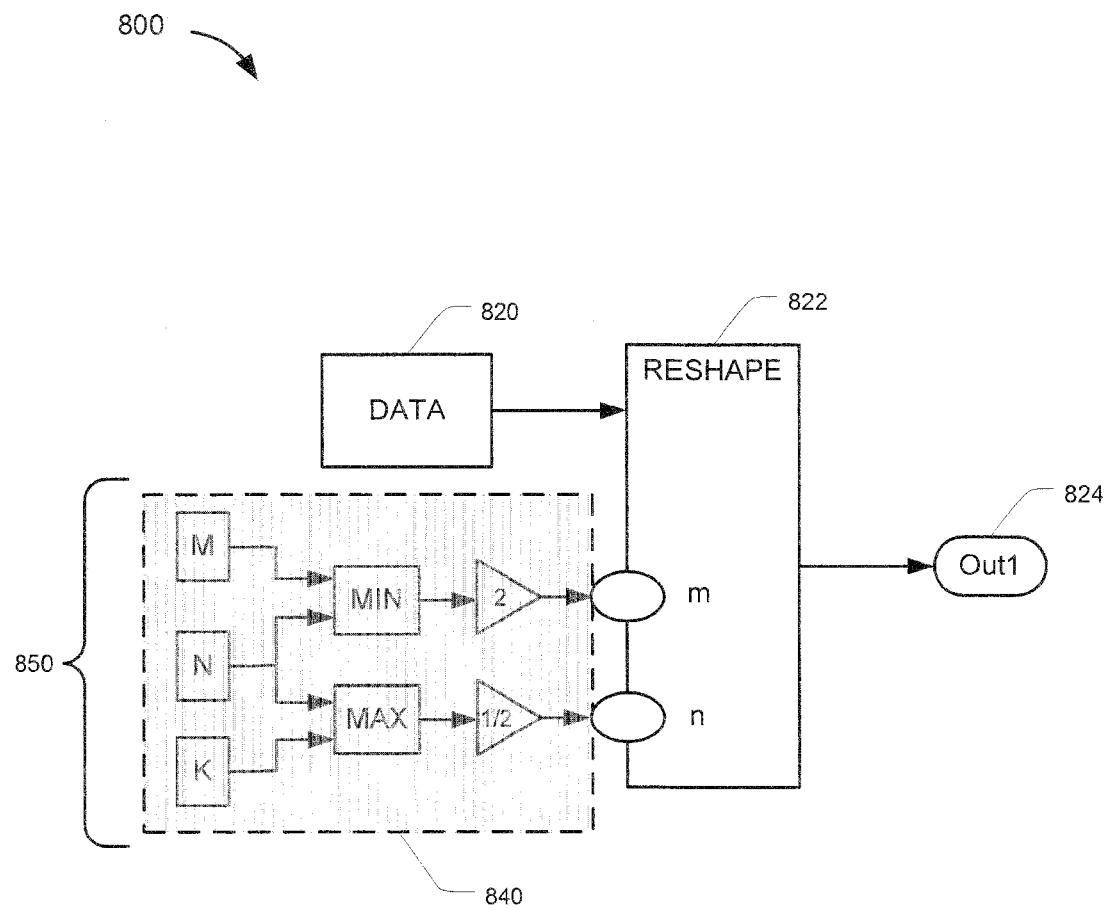
FIG. 8 illustrates another example of displaying a configuration subgraph, associated with a block diagram model, to indicate that the configuration subgraph is not executed and/or compiled when a dynamic portion of the block diagram model is executed and/or compiled.

A special hierarchical block diagram element may be employed as a visual affordance for a configuration subgraph. For example, FIG. 8 illustrates an example of a block diagram model 800 where a subsystem 840 may be used to demarcate a configuration subgraph 850 associated with the block diagram model 800. Referring to FIG. 8, the configuration subgraph 850 includes blocks contained in the subsystem 840. A dynamic portion of the block diagram model 800 includes blocks 820, 822, and 824. Note that in FIG. 8, the subsystem 840 demarcates the configuration subgraph 850 from the dynamic portion of the block diagram model 800.

It should be noted that a tab and/or a dialog window may be used to display a configuration subgraph associated with a model. Moreover, a configuration subgraph, associated with a model, may be stored in a specially named model file that may be different than a file used to store a dynamic portion of the model. In addition, storing and/or displaying configuration subgraphs may be determined based on what is considered appropriate for a particular application of the configuration subgraph.

A display control may be provided that may be used to, for example, select how and/or when a configuration subgraph may be displayed. For example, a graphical user interface (GUI) widget may be provided to specify whether a configuration subgraph, associated with a model, is displayed during a compilation and/or execution of a dynamic portion of the model. Moreover, the widget may also be used to specify how the configuration subgraph is displayed.

Figure 9:
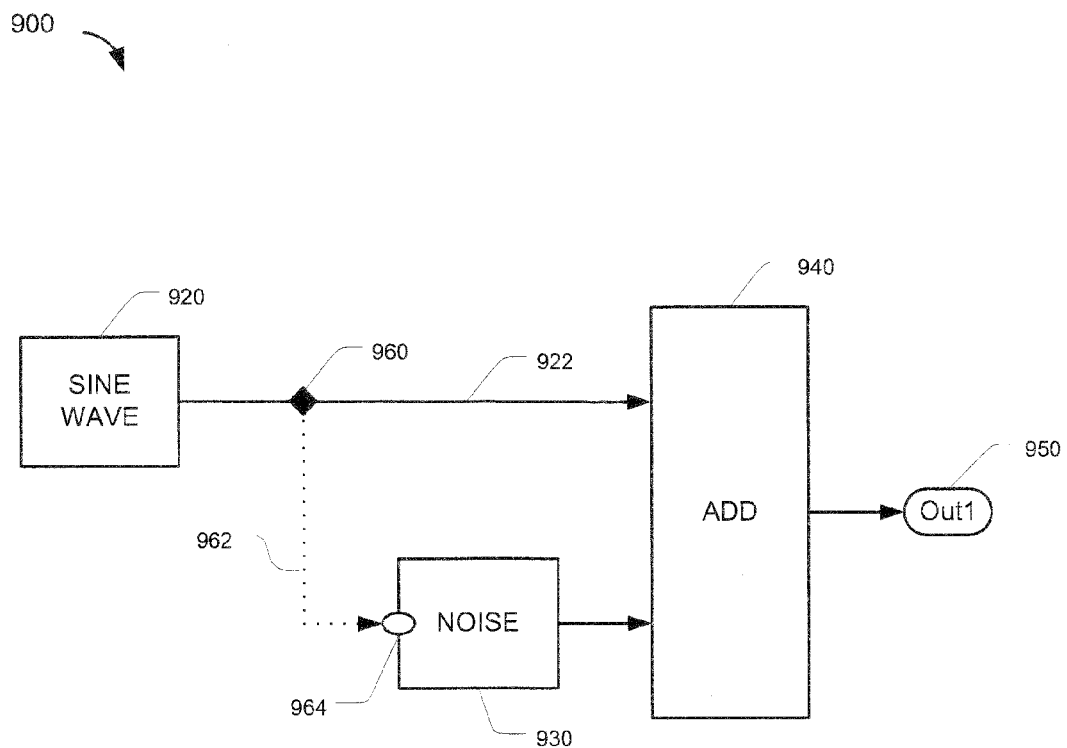
FIG. 9 illustrates an example of a block diagram model where an attribute, associated with a first element in the block diagram model, is used to derive an attribute associated with a second element in the block diagram model.

An attribute associated with an element in a model may be derived based on, for example, an attribute associated with another element in the model. FIG. 9 illustrates an example of a block diagram model 900 where an attribute, associated with a noise block 930 in the block diagram model 900, is derived based on an attribute associated with a sine wave block 920 in the block diagram model 900.

Referring to FIG. 9, block diagram model 900 includes sine wave block 920, add block 940, noise block 930, and outport block 950. The add block 940 may add a signal, which may be output from sine wave block 920, to a signal, which may be output from block 930, to produce a resultant signal. The resultant signal may be output from the block diagram model 900 via outport 950.

Noise block 930 includes attribute port 964. Attribute port 964 may be used to input one or more attributes into noise block 930. The attributes may be associated with a signal that may be output from noise block 930. The attributes may be derived from a signal that is output by the sine wave block 920. For example, the signal outputted from the noise block 930 may be a multidimensional array of size m-by-n. Values of m and n may be derived from the signal that is output from the sine wave block 920 and the derived values may be input into noise block 930 via attribute port 964 to configure m and n.

Connector 960 and/or line 962 may be used to indicate that the attribute is (1) derived from the signal that is output from block 920 and (2) provided to attribute port 964. Note that line 962 may be presented differently in the block diagram model 900 than, for example, a signal line, such as signal line 922, to provide this indication. Moreover, connector 960 may be presented differently than other connectors to provide this indication. Showing line 962 and line connector 960 differently may be used to further indicate, for example, that line 962 and/or connector 960 may not be involved in a compilation and/or execution of the dynamic portion of block diagram model 900.

A configuration subgraph may be used to (1) select an attribute associated with a first element in a model and (2) derive an attribute, associated with a second element in the model, based on the selected attribute. For example, FIG. 10 illustrates a block diagram model 1000 having a configuration subgraph 1070 that may (1) select an attribute associated with a signal that may be output from block 1020 and (2) use the selected attribute to derive an attribute for operation block 1030.

Figure 10:
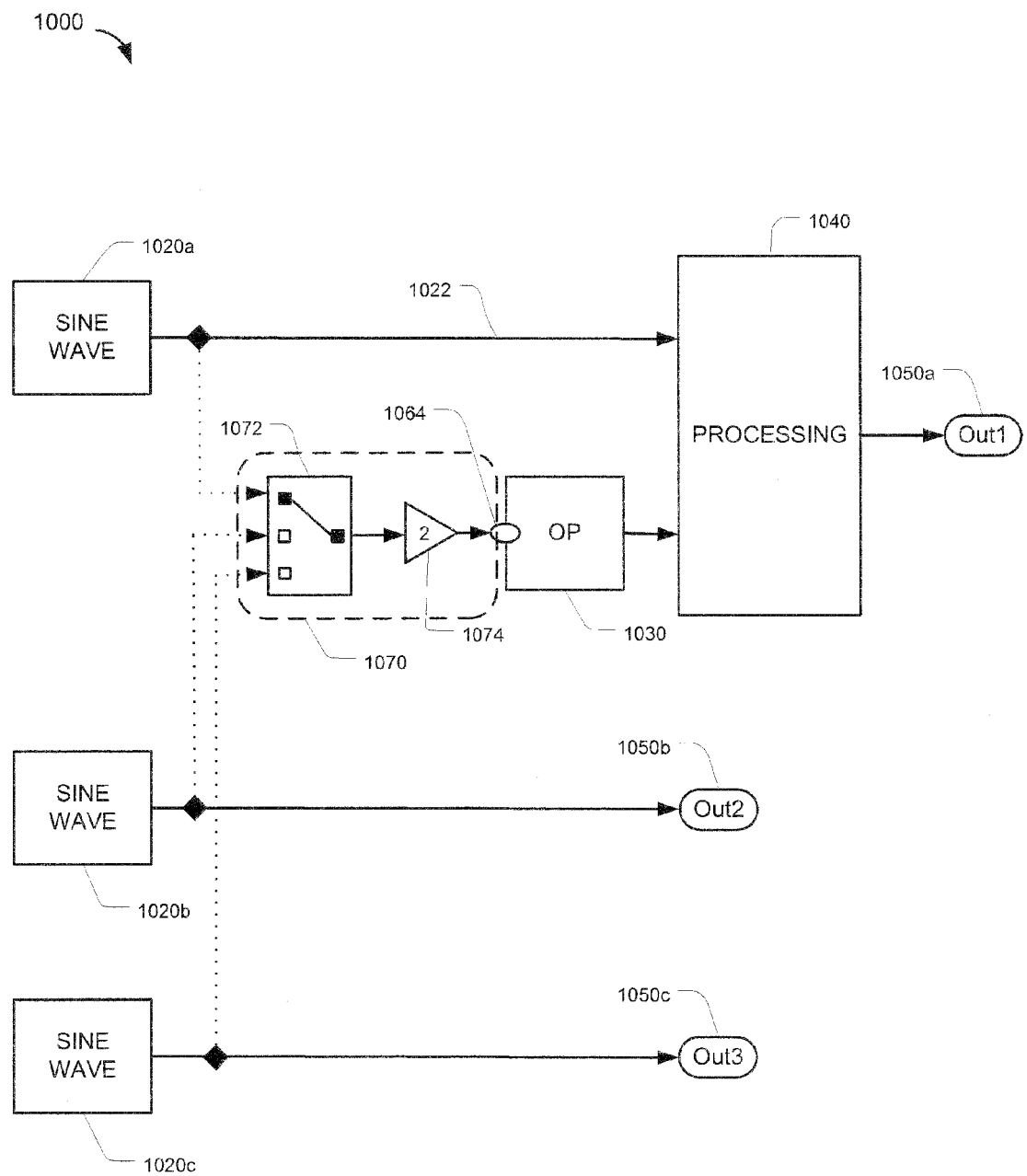
FIG. 10 illustrates an example of a block diagram model where a configuration subgraph may be used to select an attribute, associated with a first element in the block diagram model, that may be used to derive an attribute associated with a second element in the block diagram model.

Referring to FIG. 10, model 1000 may include a configuration subgraph portion and a dynamic portion. The configuration subgraph portion includes selector block 1072 and gain block 1074, which are contained in configuration subgraph 1070. The dynamic portion includes sine wave blocks 1020a-c, operation block 1030, processing block 1040, and outport blocks 1050a-c. Sine wave block 1020a may output a signal that is fed to the processing block 1040. In addition, operation block 1030 may output a signal that is fed to the processing block 1040. The processing block 1040 may (1) process the signal from the sine wave block 1020a and the signal from the operation block 1030, and (2) produce an output signal that may be output from the dynamic portion of the block diagram model via outport block 1050a.

The selector block 1072 may select an attribute (e.g., data type, dimensions) associated with a signal that is output from sine wave block 1020a, 1020b, or 1020c. The gain block 1074 may multiply the selected attribute by the value "2" to derive an attribute that is input into the operation block 1030 via attribute port 1064.

For example, the signal that is output from the sine wave block 1020a may be a multidimensional array and an attribute of the signal may be a dimensionality of the array. Selector block 1072 may select this attribute and provide a value that represents the dimensionality of the array to gain block 1074. Gain block 1074 may multiply the value by "2" and input the result into operation block 1030 via attribute port 1064. Operation block 1030 may use the result to, for example, establish a dimensionality for a signal that may be output by the operation block 1030.

Figure 11:
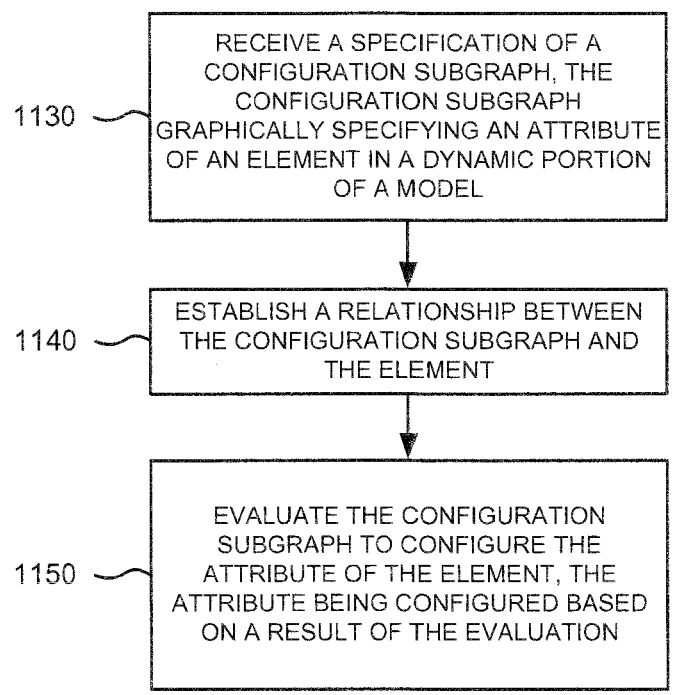
FIG. 11 illustrates a flow chart of example acts that may be used to receive a specification of a configuration subgraph, establish a relationship between the configuration subgraph and an element in a model, and evaluate the configuration subgraph to configure an attribute associated with the element.

FIG. 11 illustrates a flow chart of example acts that may be used to receive a specification of a configuration subgraph, establish a relationship between the configuration subgraph and an element in a dynamic portion of a model (e.g., a graphical block diagram model), and evaluate the configuration subgraph to configure an attribute associated with the element. Note that some or all of the acts may be performed, for example, prior to or during a compilation of the model.

Referring to FIG. 11, at block 1130, the specification of the configuration subgraph is received. The configuration subgraph may graphically specify the attribute of the element in the dynamic portion of the model. At block 1140, the relationship between the configuration subgraph and the element is established.

For example, the model may be a graphical block diagram model and the relationship may be established by connecting an output of the configuration subgraph to an attribute port that may be associated with the element. The connection may be graphically represented in the graphical block diagram model as a line between the output of the configuration subgraph and the attribute port.

At block 1150, the configuration subgraph may be evaluated to produce a result (e.g., a value). The result may be used to configure the attribute associated with the element. Evaluation may include executing the configuration subgraph to produce the result. Some or all of the evaluation may occur, for example, prior to and/or during a compilation of the dynamic portion of the model.

For example, referring to FIGS. 1 and 11, using a TCE a user may graphically specify blocks 121-127 and graphically specify connections between the blocks 121-127 (block 1130). The connections may represent relationships between the blocks 121-127. The TCE may provide a canvas that may be used to build the configuration subgraph 120. The user may graphically specify the blocks 121-127 by selecting blocks 121-127 from various libraries that may be provided by the TCE and direct the TCE to place the blocks on the canvas. The user may direct the TCE to place the blocks on the canvas by, for example, dragging-and-dropping the blocks from the library onto the canvas. Moreover, the user may graphically specify connections between the blocks 121-127 by directing the TCE to connect the blocks 121-127 using lines.

The user may direct the TCE to establish a relationship between the configuration subgraph 120 and reshape block 106 by connecting outputs of the configuration subgraph 120 to configuration ports 110a-b using the TCE (block 1140). The TCE may evaluate the configuration subgraph 120 to configure attributes m 110a and n 110b (block 1150). Specifically, the TCE may evaluate (e.g., execute) the configuration subgraph 120 to identify values for attributes m 110a and n 110b. The TCE may set the values of attributes m 110a and n 110b based on the identified values.

Note that if an error is detected, for example, during an evaluation of a configuration subgraph, a default value may be used for an attribute that is configured by the configuration subgraph. Thus, in the example above, if, for example, during the evaluation of configuration subgraph 120, an error is detected, the TCE may set the values of attributes m 110a and n 110b based on one or more default values for these attributes.

Figure 12A:
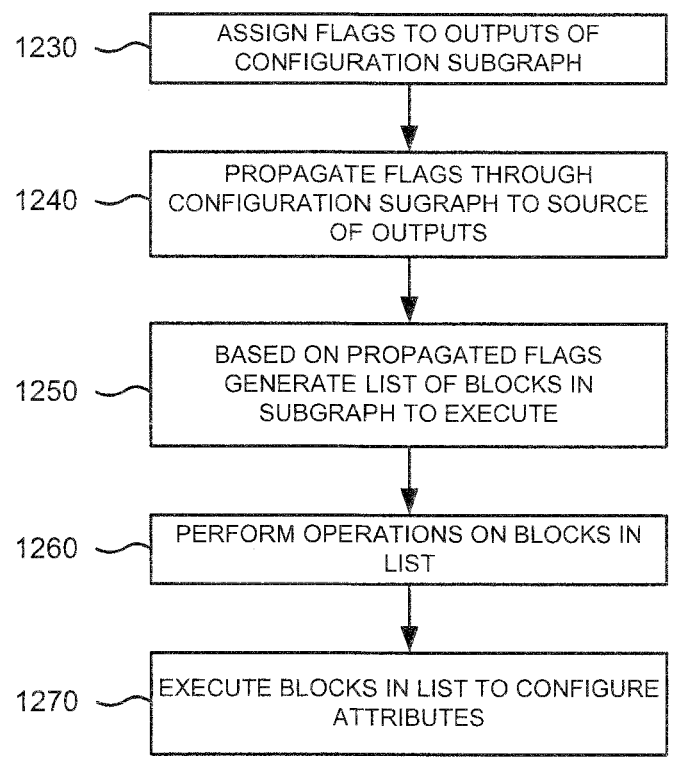
FIG. 12A illustrates a flow chart of example acts that may be used to configure one or more attributes, associated with one or more elements in a dynamic portion of a model, using a configuration subgraph.

FIG. 12A illustrates a flow chart of example acts that may be used to configure one or more attributes associated with a dynamic portion of a model using a configuration subgraph. Note that some or all of the acts may be performed, for example, prior to or during a compilation of the dynamic portion.

Referring to FIG. 12A, at block 1230, one or more flags may be assigned to one or more outputs of the configuration subgraph. At block 1240, the assigned flags may be propagated backwards from the one or more outputs to one or more sources for the outputs. At block 1250, a list of blocks in the configuration subgraph is generated. The list may include blocks that may be, for example, executed prior to a compilation of the dynamic portion of the model to identify one or more attributes for the dynamic portion.

At block 1260, one or more operations may be performed on one or more of the blocks in the list. The operations may include, for example, source/destination analysis, identifying various attributes associated with blocks in the list, complexity propagations, buffer allocations, and/or block sorting. At block 1270, one or more blocks in the list may be executed to configure the one or more attributes in the dynamic portion.

Figure 12B:
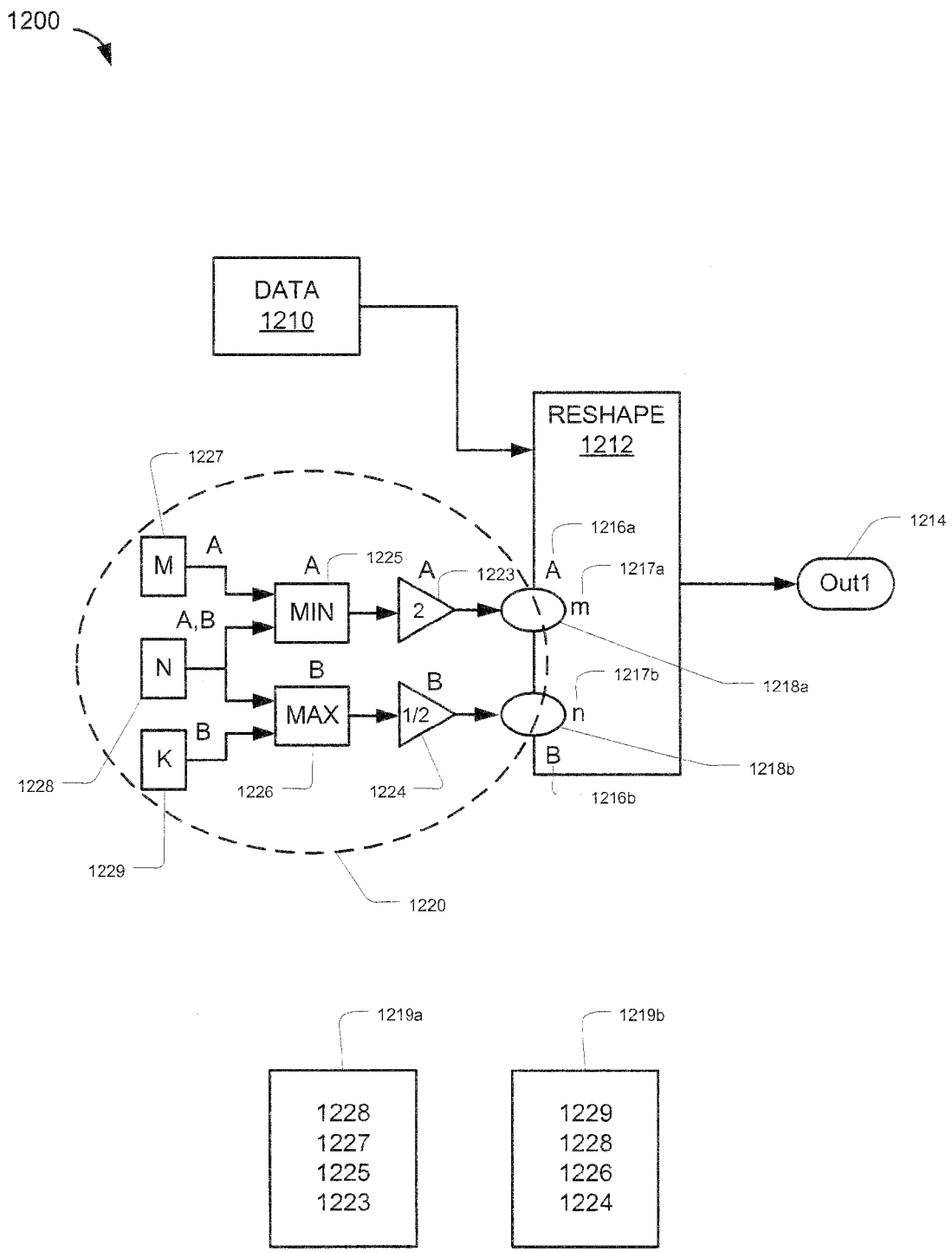
FIG. 12B illustrates an example of applying acts, contained in the flow chart illustrated in FIG. 12A, to configure attributes, associated with a reshape block, using a configuration subgraph.

For example, referring to FIG. 12B, suppose that block diagram model 1200 includes a data block 1210, a reshape block 1212, an outport block 1214 and a configuration subgraph 1220. Further suppose that (1) reshape block 1212 is associated with two attributes m 1217a and n 1217b and (2) attributes m 1217a and n 1217b define a dimensionality of a signal that may be output from reshape block 1212. In addition, suppose that (1) a dynamic portion for the block diagram model 1200 includes blocks 1210, 1212, and 1214, and (2) configuration subgraph 1220 is used to configure attributes m 1217a and n 1217b prior to a compilation of the dynamic portion.

Referring now to FIGS. 12A-B, prior to the compilation of the dynamic portion, flag "A" 1216a is assigned to attribute port 1218a and flag "B" 1216b is assigned to attribute port 1218b (block 1230). The flags 1216a-b are propagated through the configuration subgraph 1220 to sources for the attribute ports 1218a-b (block 1240). Specifically, for attribute port 1218a, flag 1216a is propagated to blocks 1223, 1225, 1227, and 1228. Note that the outputs of blocks 1227 and 1228 provide source signals for attribute port 1218a. Likewise, for attribute port 1218b, flag 1216b is propagated to blocks 1224, 1226, 1228, and 1229. Note that the outputs of blocks 1228 and 1229 provide source signals for attribute port 1218b.

Lists 1219*a-b* may be generated based on the propagated flags (block 1250). The lists 1219*a-b* may list blocks that may be executed to configure attributes 1217*a-b* in the dynamic portion of the model prior to a compilation of the model 1200. For example, list 1219*a* lists blocks that may be executed to configure attribute 1217*a*. Likewise, for example, list 1219*b* lists blocks that may be executed to configure attribute 1217*b*. Note that the blocks may be listed in an order in which the blocks may be executed. Also note that various operations may be performed on the blocks in the list, such as one or more of the operations described above with respect to block 1260.

The blocks listed in the lists 1219*a-b* may be executed to configure attributes 1217*a-b* for reshape block 1212 (block 1270). For example, blocks 1228, 1227, 1225, and 1223 may be executed, in that order, to configure attribute 1217*a*. Likewise, blocks 1229, 1229, 1226, and 1224 may be executed, in that order, to configure attribute 1217*b*. After attributes 1217*a-b* are configured, the dynamic portion of the block diagram model may be compiled.

Figure 13:
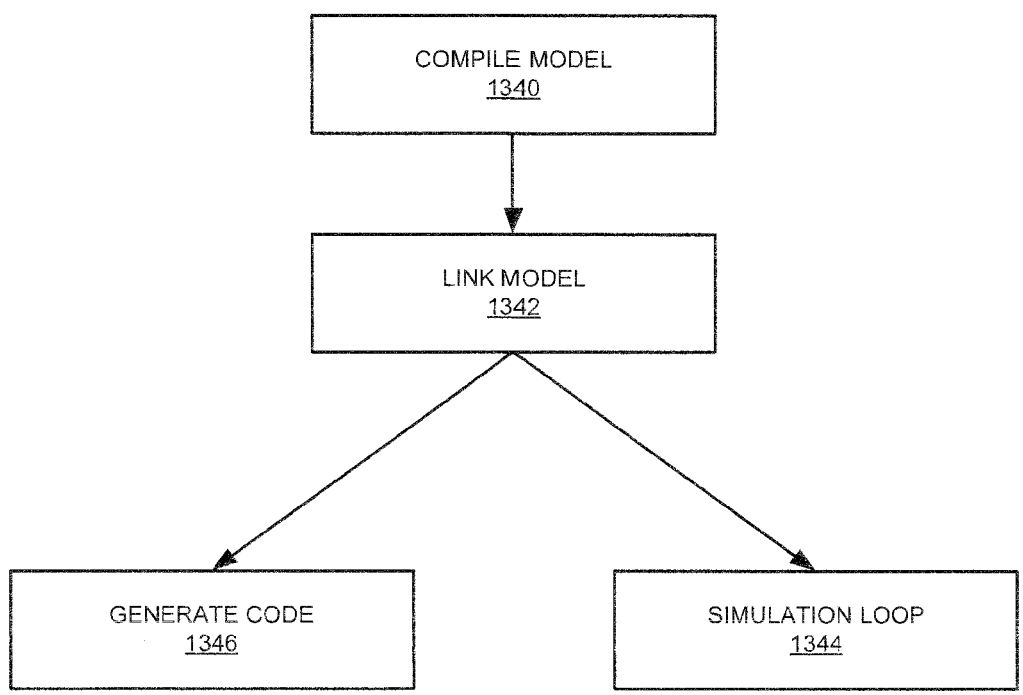
FIG. 13 illustrates a flow chart of example acts that may be used in a simulation of a model containing a configuration subgraph.

FIG. 13 illustrates a flow chart of example acts that may be performed in a simulation of a model containing a configuration subgraph. Referring to FIG. 13, at block 1340, the model may be compiled. Compilation of the model may include (1) analyzing connectivity between blocks in the model and (2) propagating signal dimensions, sample times, data types, and other attributes throughout the model. Note that some or all of the attributes may be determined based on an evaluation of the configuration subgraph contained in the model.

Compilation of the model may also include generating a block sorted list. The block sorted list may define an ordering of execution of block methods within the model. Note that the block methods may be implementations of equations defined by the block (block equations). The block sorted list may be generated based on, for example, a connectivity of blocks in the model and/or one or more equations that may be associated with one or more block equations in the model. One or more of the block equations may be implemented using, for example, one or more functions and/or object methods.

An example of a block equation that may be an output equation, y=outputs(t,x,u), where y may correspond to one or more signals that are output from the block (output signals) and/or other outputs of the block, t may correspond to a simulation time (e.g., a current simulation time), x may correspond to internal block state of the block, and u may correspond to one or more signals that are input into the block (input signals) and/or other inputs to the block. Another example of a block equation may be an update equation, y=update(t,x,u), which may be used to update one or more states associated with a block during a simulation of the model. The update may occur on a per-time step basis. Yet another example of a block equation may include a derivative equation xdot=derivatives(t,x,u). The output xdot may be derivates of inputs u.

For example, referring back to FIG. 2, block 212 may have an output equation, no input signals u, and no internal block state x. In addition, block 212 may produce an output y for a time t. Other blocks, such as an integrator block (not shown), may be associated with output, derivative, and/or other equations.

Referring back to FIG. 13, at block 1342, the compiled model is linked. Here, one or more block method execution lists may be generated from the block sorted list. A block method execution list may list an order in which one or more methods associated with one or more blocks (block methods) in the model may be performed during an execution of the model.

The block method lists may include, for example, block output method execution lists, block update method execution lists, and/or block derivative method execution lists. A block output method execution list may list one or more block methods, associated with a block, that may be executed to identify one or more outputs of the block. A block update method execution list may list one or more block methods, associated with a block, that may be executed to update state associated with the block. A block derivative method execution list may list one or more block methods, associated with a block, that may be used to identify one or more derivates associated with the block.

At block 1346, code may be generated based on, for example, the compiled and linked model. The generated code may include various block methods that may be used during an execution of the model. The code may be generated in, for example, a high-level language, such as, for example, C, C++, Java, Ada, Fortran; a machine/assembly language; and/or a hardware description language (HDL), such as Verilog or VHDL. The generated code may be compiled, for example, into software that may run on a microcontroller or other computing device. Moreover, hardware (e.g., integrated circuits) may be produced from the generated code.

At block 1344, the linked model is simulated in a simulation loop. An iteration though the simulation loop may be referred to as a time step. An example of a simulation loop may be as follows:

```
SimLoop
    y=MajorOutputs(t, x, u)
    x=MajorUpdate(t, x, u)
    Integrate
        y=MinorOutputs(t, x, u)
        xdot=Derivatives(t, x, u)
    end Integrate
end SimLoop
```

MajorOutputs and MinorOutputs may be similar to outputs described above. Specifically, MajorOutputs may be called to identify one or more major outputs for one or more blocks in a model and MinorOutputs may be called to identify one or more minor outputs for one or more blocks in the model. A major output may be an output that is provided by a block at a time step. A minor output may be an output provided by a block during a minor time step. MajorUpdate may be similar to update described above. Specifically, MajorUpdate may update state associated with one or more blocks for a given time step. Derivatives may be similar to derivatives described above. Derivatives may identify one or more derivates of one or more inputs to one or more blocks in the model.

A configuration subgraph may not be executed during a run-time execution of a model. For example, blocks contained in a configuration subgraph may not be executed when a model is simulated using a simulation loop. Moreover, during code generation, code that is generated from a model may include code for a dynamic portion of the model but not code for a configuration subgraph of the model. Thus, executing the code would not cause the configuration subgraph to be executed.

For example, referring to FIGS. 2 and 13, blocks 214 and 216, in the configuration subgraph 202, may be executed to identify attributes W and F. The identified attributes may be propagated throughout the dynamic portion of the model to configure attributes in the dynamic portion prior to compilation of the dynamic portion. The dynamic portion of the model may then be compiled (block 1340) and linked (block 1342) to produce a linked version of the model. Code may be generated from the linked version of the model (block 1346). Note that, in this example, the configuration subgraph is executed to configure attributes in the dynamic portion of the model prior to the compilation of the dynamic portion. The dynamic portion of the model is then compiled. Thus, the dynamic portion of the model is compiled based on the configured attributes. Also note that the code is generated from a linked version of the model that was generated based on the compiled dynamic portion. The code is not generated from the configuration subgraph portion of the model. Thus, the code does not contain code for the configuration subgraph.

One or more embodiments of the invention may be implemented on one or more computing devices. The one or more computing devices may be a system or part of a system. The one or more computing devices may include a desktop computer, a laptop computer, a client computer, a server computer, a mainframe computer, a personal digital assistant (PDA), a netbook computer, a tablet computer, a web-enabled cellular telephone, a smart phone, a smart sensor/actuator, or some other computing device.

Figure 14:
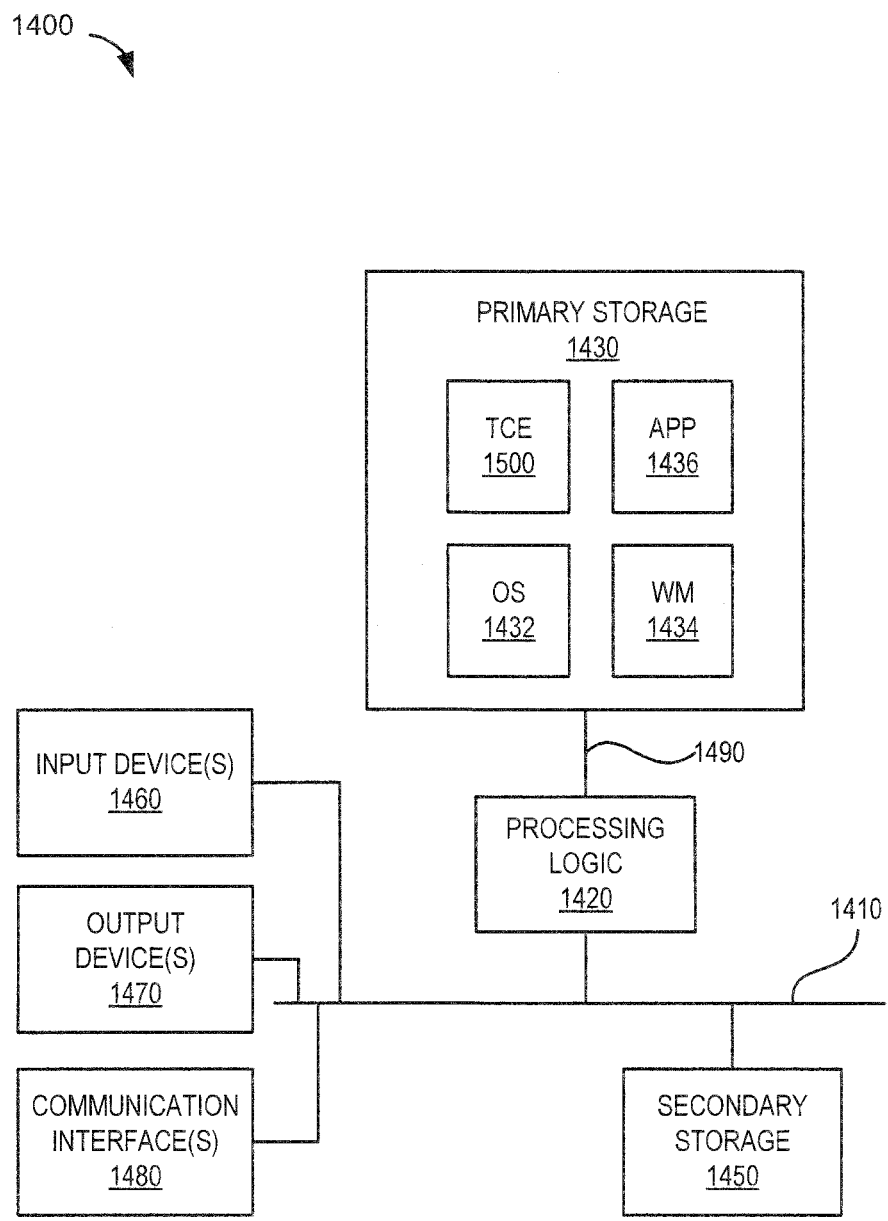
FIG. 14 illustrates an example of a computing device that may implement one or more embodiments of the invention.

FIG. 14 illustrates an example of a computing device 1400 that may be suitable for implementing one or more embodiments of the invention. Referring to FIG. 14, the computing device 1400 may include one or more components, such as input-output (I/O) bus 1410, processing logic 1420, primary storage 1430, secondary storage 1450, one or more input devices 1460, one or more output devices 1470, one or more communication interfaces 1480, and memory bus 1490. Note that computing device 1400 is an example of a computing device that may be suitable for implementing one or more embodiments of the invention. It should be noted that other computing devices that may be less complicated or more complicated than computing device 1400 may be suitable for implementing one or more embodiments of the invention.

The I/O bus 1410 may be an interconnect bus that may enable communication between various components in the computing device 1400, such as processing logic 1420, secondary storage 1450, input devices 1460, output devices 1470, and communication interfaces 1480. The communication may include, inter alia, transferring information (e.g., data and control information) between the components.

The memory bus 1490 may be an interconnect bus that may enable information to be transferred between the processing logic 1420 and the primary storage 1430. The information may include instructions and/or data that may be executed, manipulated, and/or otherwise processed by processing logic 1420. The instructions and/or data may include instructions and/or data that may implement one or more embodiments of the invention.

The processing logic 1420 may include logic that may interpret, execute, and/or otherwise process information contained in, for example, the primary storage 1430 and/or secondary storage 1450. The information may include computer-executable instructions and/or data that may implement one or more embodiments of the invention. The processing logic 1420 may comprise a variety of heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units, or other types of processing logic that may interpret, execute, manipulate, and/or otherwise process the information. The processing logic 1420 may comprise, for example, a single core, multiple cores, or a system on chip (SoC). An example of a processor that may be used to implement processing logic 1420 is the Intel® Xeon® processor available from Intel Corporation, Santa Clara, Calif.

The secondary storage 1450 may be a non-transient tangible computer-readable media that is accessible to the processing logic 1420 via I/O bus 110. The secondary storage 1450 may store information for the processing logic 1420. The information may be executed, interpreted, manipulated, and/or otherwise processed by the processing logic 1420. The secondary storage 1450 may comprise, for example, a storage device, such as a magnetic disk, optical disk, random-access memory (RAM) disk, and/or flash drive. The information may be stored on one or more non-transient tangible computer-readable media contained in the storage device. Examples of media that may be contained in the storage device may include magnetic discs, optical discs, and/or memory devices (e.g., flash memory devices, static RAM (SRAM) devices, dynamic RAM (DRAM) devices, or other memory devices). The information may include data and/or computer-executable instructions that may implement one or more embodiments of the invention.

The input devices 1460 may include one or more devices that may be used to input information into computing device 1400. Devices that may be used to input information into computing device 1400 may include, for example, a keyboard, computer mouse, microphone, camera, trackball, gyroscopic device (e.g., gyroscope), mini-mouse, touch pad, stylus, graphics tablet, touch screen, joystick (isotonic or isometric), pointing stick, accelerometer, palm mouse, foot mouse, puck, eyeball controlled device, finger mouse, light pen, light gun, neural device, eye tracking device, gesture tracking device, steering wheel, yoke, jog dial, space ball, directional pad, dance pad, soap mouse, haptic device, tactile device, neural device, multipoint input device, discrete pointing device, or some other input device. The information may include spatial (e.g., continuous, multi-dimensional) data that may be input into computing device 1400, for example, using a device such as a computer mouse. The information may also include other forms of data, such as, for example, text that may be input using a keyboard.

The output devices 1470 may include one or more devices that may output information from the computing device 1400. Devices that may output information from the computing device 1400 may include, for example, a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, neural stimulation device, printer, speaker, video projector, volumetric display device, plotter, or some other output device. The output devices 1470 may be directed by, for example, the processing logic 1420, to output the information from the computing device 1400. The information may be presented (e.g., displayed, printed) by the output devices 1470. The information may include, for example, graphical user interface (GUI) elements (e.g., windows, widgets, or other GUI elements), graphical representations, pictures, text, or other information that may be presented by the output devices 1470.

The communication interfaces 1480 may include logic that may (1) interface the computing device 1400 with, for example, one or more communication networks and (2) enable the computing device 1400 to communicate with one or more entities connected to the networks. An example of a computer network that may be used with computing device 1400 will be described further below with respect to FIG. 16.

The communication interfaces 1480 may include one or more transceiver-like mechanisms that may enable the computing device 1400 to communicate with entities connected to the networks. The communication interfaces 1480 may include a built-in network adapter, network interface card (NIC), Personal Computer Memory Card International Association (PCMCIA) network card, card bus network adapter, wireless network adapter, Universal Serial Bus (USB) network adapter, modem, or other device suitable for interfacing the computing device 1400 to the networks.

The primary storage 1430 may be accessible to the processing logic 1420 via bus 1490. The primary storage 1430 may comprise one or more non-transient tangible computer-readable media that may store information for processing logic 1420. The information may include computer-executable instructions and/or data that may implement operating system (OS) 1432, windows manager (WM) 1434, an application 1436 (APP), and a technical computing environment (TCE) 1400. The instructions may be executed, interpreted, and/or otherwise processed by processing logic 1420.

The primary storage 1430 may comprise a RAM that may include RAM devices configured to store information (e.g., data, executable instructions). The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

OS 1432 may be a conventional operating system that may implement various conventional operating system functions. These functions may include, for example, scheduling one or more portions of APP 1436 and/or TCE 1400 to run on the processing logic 1420, managing the primary storage 1430, controlling access to various components associated with the computing device 1400 (e.g., pointing device 1460, output device 1470, network interface 1480, secondary storage 1450), and controlling access to data received/transmitted by these components. Examples of operating systems that may be used to implement OS 1432 may include, but are not limited to, the Linux operating system, Microsoft Windows operating system, the Symbian operating system, Mac OS, Chrome OS, and the Android operating system. A version of the Linux operating system that may be used is Red Hat Linux available from Red Hat Corporation, Raleigh, N.C. Versions of the Microsoft Windows operating system that may be used include the Microsoft 7, Microsoft Windows Vista, and Microsoft Windows XP operating systems available from Microsoft Inc., Redmond, Wash. The Chrome OS and Android operating systems are available from Google, Inc., Mountain View, Calif. The Mac OS operating system is available from Apple Inc., Cupertino, Calif.

WM 1434 may be a conventional window manager that may enable GUI elements, such as widgets and windows, to be managed in a display that may be provided by an output device 1470. The WM 1434 may also be configured to (1) capture one or more positions of interactions with an input device 1460 and/or other data associated with input device 1460, and (2) provide the positions and/or data to OS 1432, APP 1436, and/or TCE 1400. The positions and/or data may be provided, for example, in messages that are sent to the OS 1432, APP 1436, and/or TCE 1500. Examples of window managers that may be used to implement WM 1434 may include, but are not limited to, X windows, GNOME and KDE, which is often used with the Linux operating system, and window managers used with the Microsoft XP, Microsoft Vista, and Microsoft 7 operating systems. It should be noted that other window managers or components that implement various functions associated with window managers may be used to implement WM 1434.

APP 1436 may be designed to perform a particular task or tasks. APP 1436 may be an executable and/or interpretable version of a software application that may be written in a programming language, such as C, C++, JAVA, or some other programming language. The software application may be, for example, written by a user of computing device 1400 or supplied by a vendor. Some or all of APP 1436 may operate under the control of OS 1432. APP 1436 may include computer-executable instructions and/or data that may implement one or more embodiments of the invention.

TCE 1500 may be a modeling environment, such as a graphical modeling environment or textual modeling environment. Some or all of TCE 1500 may operate under the control of OS 1432. TCE 1500 may include computer-executable instructions and/or data that may implement one or more embodiments of the invention.

Figure 15:
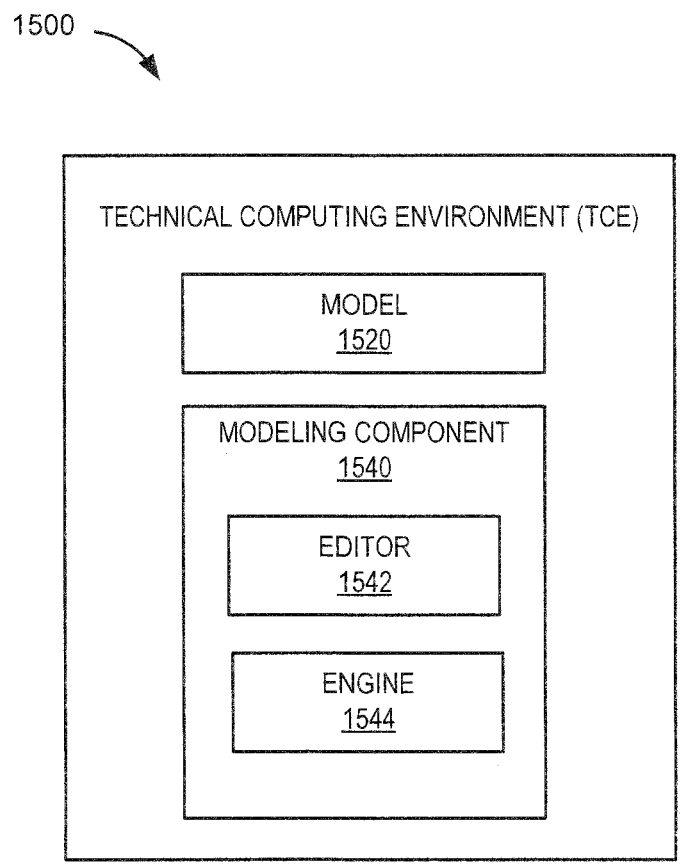
FIG. 15 illustrates an example of a technical computing environment that may implement one or more embodiments of the invention.

FIG. 15 illustrates an example embodiment of TCE 1500. Referring to FIG. 15, TCE 1500 may include various components including model 1520 and modeling component 1540. TCE 1500 may, inter alia, be used to construct, compile, execute, and/or interpret model 1520.

The TCE 1500 may include hardware-based and/or software-based logic that may provide a computing environment that may allow, for example, a user to perform tasks related to disciplines, such as, but not limited to, mathematics, science, engineering, medicine, business, biology, and/or finance. The TCE 1500 may include a dynamically-typed programming language (e.g., the MATLAB® language) that may be used to express problems and/or solutions in mathematical notations.

For example, the TCE 1500 may use an array as a basic element, where the array may not require dimensioning specified by a user. The array may be used to support array-based programming where an operation may apply to an entire set of values included in the array. Array-based programming may allow array-based operations to be treated as a high-level programming technique that may allow, for example, operations to be performed on whole aggregations of data without having to resort to explicit loops of individual non-array operations.

In addition, the TCE 1500 may perform matrix and/or vector formulations that may be used for data analysis, data visualization, application development, simulation, modeling, and/or algorithm development. These matrix and/or vector formulations may be used in many areas, such as statistics, image processing, signal processing, control design, life sciences modeling, discrete event analysis and/or design, state-based analysis and/or design, and so on.

The TCE 1500 may further provide mathematical functions and/or graphical tools. The TCE 1500 may provide some or all of these functions and/or tools using toolboxes (e.g., toolboxes for signal processing, image processing, data plotting, and/or parallel processing). The toolboxes may provide some or all of these functions and/or graphical tools as block sets. Moreover, the TCE 1500 may provide some or all of these functions and/or graphical tools in other ways, such as via a library, local or remote database, and so on.

The TCE 1500 may include provisions for creating, compiling, executing, and/or interpreting model model 1520. Model 1520 may be graphical and/or executable. Moreover, model 1520 may be textual or some combination of graphical and textual. Model 1520 may contain a configuration subgraph that may be used to configure one or more attributes associated with the model 1520, as described above. TCE 1500 may contain provisions for creating and/or evaluating the configuration subgraph.

TCE 1500 may contain computer-executable instructions and data that may perform various tasks. The tasks may include, for example, (1) constructing model 1520 through an interface, such as a GUI; (2) allowing an augmentation of a pre-defined set of blocks with custom user-specified blocks that may be associated with model 1520; (3) using model 1520 to compute and trace an evolution, such as a temporal evolution, of outputs associated with a dynamic system represented by the model 1520; and (4) automatically producing, for example, deployable software systems, and descriptions of hardware systems that mimic a behavior of either the entire model 1520 or portions of the model 1520. The blocks may be represented in a graphical representation (e.g., a block diagram) of the model 1520. The graphical representation may be presented by the TCE 200 to, for example, a user via an interface, such as a GUI.

Examples of TCEs that may be adapted to incorporate one or more embodiments of the invention may include, but are not limited to, MATLAB®, Simulink®, Stateflow®, and SimEvents®, which are available from The MathWorks, Inc.; Unified Modeling Language (UML); profiles associated with UML (e.g., Modeling Analysis and Real-Time Embedded Systems (MARTE), Systems Modeling Language (SysML), Avionics Architecture Description Language (AADL)); GNU Octave from the GNU Project; MATRIXx and LabView® from National Instruments; Mathematica from Wolfram Research, Inc.; Mathcad from Mathsoft Engineering & Education Inc.; Maple from Maplesoft; Extend from Imagine That, Inc.; Scilab and Scicos from The French Institution for Research in Computer Science and Control (INRIA); Modelica or Dymola from Dynasim AB; VisSim from Visual Solutions; SoftWIRE from Measurement Computing Corporation; WiT from DALSA Coreco; Advanced Design System, VEE Pro and SystemVue from Agilent Technologies, Inc.; Vision Program Manager from PPT Vision, Inc.; Khoros from Khoral Research, Inc.; VisiQuest from Pegasus Imaging Corporation; Gedae from Gedae, Inc.; Virtuoso from Cadence Design Systems, Inc.; Rational Rose, Rhapsody, and Tau from International Business Machines (IBM), Inc.; SCADE from Esterel Technologies; and Ptolemy from the University of California at Berkeley.

Model 1520 may be, for example, a time-based graphical block diagram model, a state transition diagram, a discrete event model, an activity diagram, a UML diagram, a sequence diagram, a data flow model, or some other type of model or diagram. Model 1520 may be graphical, textual, or some combination of graphical and textual. Model 1520 may include a configuration subgraph and a dynamic portion of the block diagram model of the configuration subgraph. The configuration subgraph may be, for example, used to configure one or more attributes for one or more elements in the dynamic portion of the block diagram model. One or more portions of model 1520 may represent a system. The system may be dynamic, linear, non-linear, or some other type of system.

A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems. Examples of man-made or engineered dynamic systems may include, for example, a bouncing ball, a spring with a mass tied on an end, automobiles, airplanes, control systems in major appliances, communication networks, audio signal processing, nuclear reactors, and a stock market.

The system represented by model 1520 may have various execution semantics that may be represented in model 1520 as a collection of modeling elements. An element (e.g., a block) of the model 1520 may generally refer to a portion of functionality that may be used in the model 1520. The element may be graphically represented, however, it can be appreciated that the element does not necessarily need to be represented graphically. For example, an element may be represented textually or stored in some form of internal representation. Also, a particular visual depiction used to represent an element may generally be an arbitrary design choice.

An element may be hierarchical in that the element itself may comprise one or more sub-elements that make up the element. A block comprising one or more blocks (sub-blocks) may be referred to as a subsystem block. A subsystem block may be configured to represent a subsystem of the overall system represented by the model 1520.

Modeling component 1540 may include an editor 1542 and an engine 1544. Editor 1542 may be a block diagram editor that may allow, for example, a user, to specify, edit, annotate, save, publish, and print a block diagram of model 1520. The editor 1542 may contain provisions for editing code (e.g., source code), requirements, and/or tests that may be associated with model 1520.

The engine 1544 may enable a computation and/or tracing of a dynamic system's outputs from the model 1520. The engine 1544 may compile and link the model 1520 to produce an "in-memory executable" version of model 1520 that may be used for simulating, verifying, generating code, trimming, or linearizing the model 1520.

Compiling may include evaluating a configuration subgraph that may be included in the model. Compiling may also include checking an integrity and validity of block interconnections in the block diagram. At this stage, the engine 1544 may also sort the blocks in the block diagram into hierarchical lists that may be used when creating block execution lists. Linking may include using a result of the compiled stage to allocate memory needed for an execution of the various components of the model 1544. Linking may also include producing execution lists that are used, for example, by a simulation or linearization of the model 1520. Included within the link stage may be an initialization of the model 1520 which may include an evaluating of "setup" methods (e.g. block start, initialize, enable, and constant output methods).

Note that model 1520 may also be a structural model, such as for example, a software architecture model, an electronics hardware model, a network architecture model, a mechanical structure model, an electro-mechanical structure model, or a UML diagram.

Figure 16:
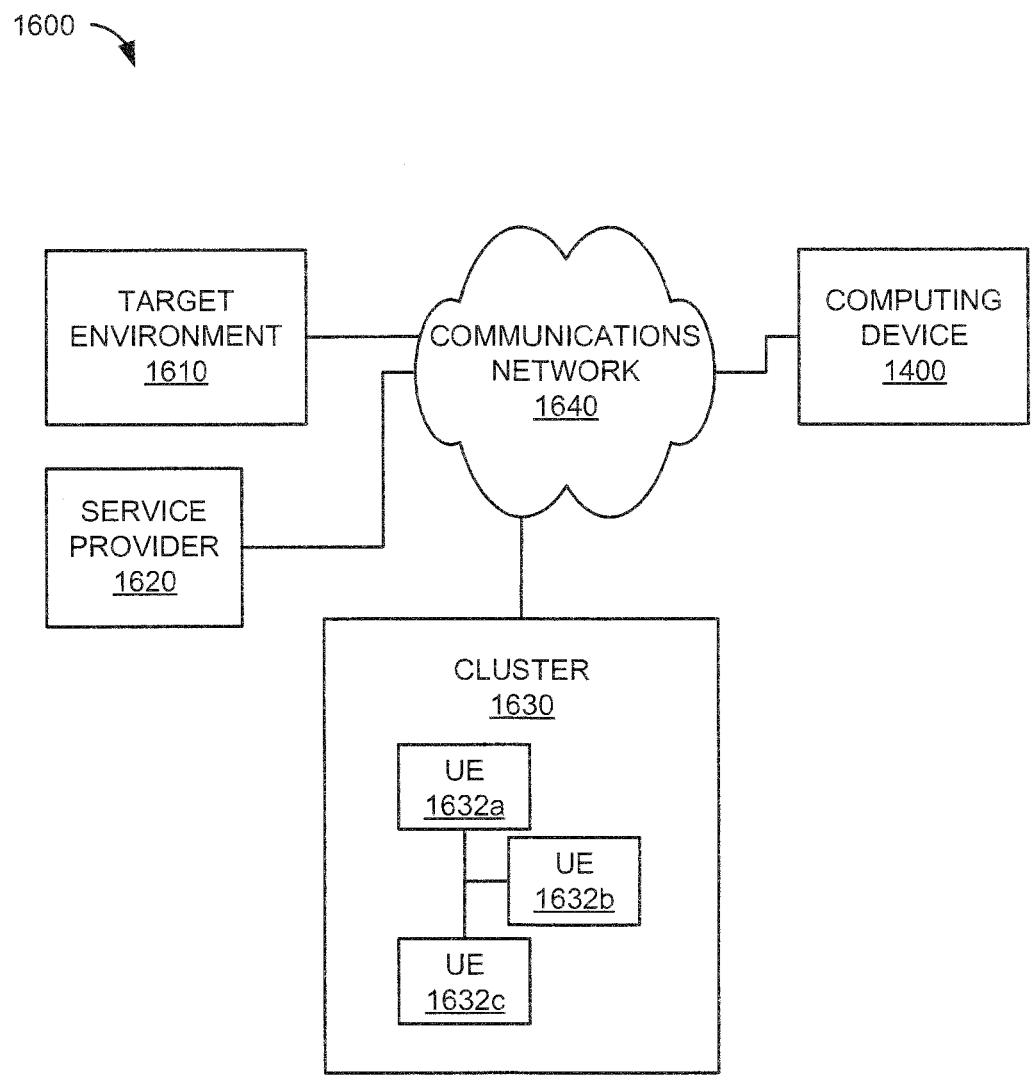
FIG. 16 illustrates an example of a communications network that may implement one or more embodiments of the invention.

One or more embodiments of the invention may be implemented in a distributed environment. FIG. 16 illustrates an example of a distributed environment 1600 that may implement one or more embodiments of the invention. Referring to FIG. 16, environment 1600 may contain various entities including computing device 1400, target environment 1610, service provider 1620, cluster 1630, and communications network 1640. Note that the distributed environment 1600 is just one example of a distributed environment that may be used with one or more embodiments of the invention. Other distributed environments that may be used with one or more embodiments of the invention may contain more entities, fewer entities, entities in arrangements that differ from the arrangement illustrated in FIG. 16, and so on. Moreover, the distributed environments may be configured to implement various "cloud computing" frameworks.

Details of computing device 1400 were described above with respect to FIG. 14. In distributed environment 1600, computing device 1400 may, inter alia, exchange information (e.g., data) with target environment 1610, service provider 1620, and/or cluster 1630 via communications network 1640. Computing device 1400 may interface with network 1640 via a communications interface 1480.

Target environment 1610 may be configured to interpret and/or execute a compiled version of, for example, APP 1436 or model 1420, which may be generated in or otherwise made available to the distributed environment 1600. Communications network 1640 may be a digital and/or analog network capable of exchanging information between computing device 1400, target environment 1610, service provider 1620, and/or cluster 1630. The information may be adapted for transfer in the communications network 1640. For example, the information may be encapsulated in one or more packets that may be used to transfer the information through the communications network 1640.

Information may be exchanged between entities using various communication protocols, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802.11, or other communication protocol.

The communications network 1640 may include various network devices, such as gateways, routers, switches, firewalls, servers, repeaters, address translators, or other network devices. Portions of the communications network 1640 may be wired (e.g., using wired conductors, optical fibers) and/or wireless (e.g., using free-space optical (FSO), radio frequency (RF), acoustic transmission paths). Portions of communications network 1640 may include a substantially open public network, such as the Internet. Portions of the communications network 1640 may include a more restricted network, such as a private corporate network or virtual private network (VPN). It should be noted that implementations of networks and/or devices operating on networks described herein are not limited with regards to, for example, information carried by the networks, protocols used in the networks, and/or the architecture/configuration of the networks.

The service provider 1620 may include logic that may make a service available to another entity in the distributed environment 1600. The service provider 1620 may also include a server operated by, for example, an individual, a corporation, an educational institution, a government agency, and so on, that provides one or more services to an entity in distributed environment 1600. The services may include software containing computer-executable instructions that may implement one or more embodiments of the invention or portions thereof, and may be executed, in whole or in part, by (1) an entity in distributed environment 1600, (2) the service provider 1620 on behalf of an entity in distributed environment 1600, or (3) some combination thereof.

For example, in an embodiment, service provider 1620 may provide one or more subscription-based services that may be available to various customers. The services may be accessed by a customer via network 1640. The customer may access the services using a computing device, such as computing device 1400. The services may include services that implement one or more embodiments of the invention or portions thereof. The service provider 1620 may limit access to certain services based on, for example, a customer service agreement between the customer and the service provider 1620.

The service agreement may allow the customer to access the services. The services may allow the customer to build, execute, and/or otherwise process, for example, APP 1436 and/or model 1420. The service agreement may include other types of arrangements, such as certain fee-based arrangements or restricted access arrangements. For example, a customer may pay a fee which may provide the customer unlimited access to a given package of services for a given time period (e.g., per minute, hourly, daily, monthly, yearly, etc.). For services not included in the package, the customer may have to pay an additional fee in order to access one or more of the services not included in the package. Still other arrangements may be resource-usage based. For example, the customer may be assessed a fee based on an amount of computing resources and/or network bandwidth used.

Cluster 1630 may include a number of units of execution (UEs) 1632 that may perform processing of one or more embodiments of the invention or portions thereof on behalf of computing device 1400 and/or another entity, such as service provider 1620. The UEs 1632 may reside on a single device or chip or on multiple devices or chips. For example, the UEs 1632 may be implemented in a single ASIC or in multiple ASICs. Likewise, the UEs 1632 may be implemented in a single computer system or multiple computer systems. Other examples of UEs 1632 may include, for example, some combination of FPGAs, CPLDs, ASIPs, processors, multiprocessor systems-on-chip (MPSoCs), graphic processing units, and/or microprocessors. The UEs 1632 may be configured to perform one or more operations on behalf of another entity in the distributed environment 1600. For example, in an embodiment, the UEs 1632 are configured to execute portions of code associated with the TCE 1400. Here, the TCE 1400 may dispatch certain activities pertaining to one or more embodiments of the invention to the UEs 1632 for execution. The service provider 1620 may configure cluster 1630 to provide, for example, the above-described services to computing device 1400 on a subscription basis (e.g., via a web service).

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above with respect to FIGS. 11, 12A, and 13, the order of the acts may be modified in other implementations. Further, non-dependent acts may be performed in parallel.

Also, the term "user", as used herein, is intended to be broadly interpreted to include, for example, a computing device (e.g., a workstation) or a user of a computing device, unless otherwise stated.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as logic that may perform one or more functions. This logic may be hardware-based, software-based, or a combination of hardware-based and software-based. The logic may be stored in one or more non-transient tangible computer-readable storage media and may include computer-executable instructions that may be executed by processing logic, such as processing logic 1420. The computer-executable instructions may include instructions that may implement one or more embodiments of the invention. The non-transient tangible computer-readable storage media may be volatile or non-volatile and may include, for example, flash memories, dynamic memories, removable disks, and/or non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. A computing device implemented method, comprising:
   accessing, using processing logic, a block diagram model, the block diagram model:
     having a dynamic portion, the dynamic portion associated with an element having an attribute, and
     having a configuration subgraph portion with a graphical entity for configuring the attribute of the element of the dynamic portion, the configuration subgraph portion being directly or indirectly connected to the dynamic portion through a connection;
   evaluating, using the processing logic, the configuration subgraph portion of the block diagram model, the evaluating comprising:
     associating a flag with the attribute of the element of the dynamic portion,
     propagating the flag backwards from the element of the dynamic portion to the graphical entity of the configuration subgraph portion using the connection,
     accessing the graphical entity of the configuration subgraph portion prior to compiling the dynamic portion, and
   executing the graphical entity to configure the attribute of the element of the dynamic portion,
     the configuring based on the executing of the graphical entity in the configuration subgraph portion, and
     the configuring performed prior to executing the dynamic portion of the model; and
   executing the dynamic portion of the block diagram model, the dynamic portion of the block diagram model having the configured attribute of the element.

2. The method of claim 1, further comprising:
   generating code for the dynamic portion of the block diagram model, wherein the code includes code for configuring the attribute of the element.

3. The method of claim 1, wherein the attribute is a parameter and wherein the method further comprises:
   setting a value of the parameter based on the evaluating.

4. The method of claim 1, wherein the evaluation of the configuration subgraph portion is performed prior to a verification of the dynamic portion of the block diagram model.

5. The method of claim 1, wherein the method further comprises:
   establishing the connection between the configuration subgraph portion and the element.

6. The method of claim 5, wherein the element includes an attribute port and wherein establishing the connection further comprises:
   establishing the connection between the configuration subgraph portion and the attribute port.

7. The method of claim 1, further comprising:
   displaying the configuration subgraph portion differently than the dynamic portion of the block diagram model; and
   indicating that the configuration subgraph portion is not executed during an execution of the dynamic portion of the block diagram model, the indicating based on the displaying.

8. The method of claim 1, further comprising:
   detecting an error during the evaluating of the configuration subgraph portion; and
   assigning a default value to the attribute of the element based on the detecting of the error.

9. The method of claim 1, further comprising:
   propagating the attribute to a second element of the dynamic portion of the block diagram model.

10. One or more non-transitory computer-readable storage media storing:
    one or more computer-executable instructions that, when executed by processing logic, cause the processing logic to:
      access a block diagram model, the block diagram model:
        having a dynamic portion, the dynamic portion associated with an element having an attribute, and
        having a configuration subgraph portion with a graphical entity for configuring the attribute of the element of the dynamic portion, the configuration subgraph portion being directly or indirectly connected to the dynamic portion through a connection;
      evaluate the configuration subgraph portion of the block diagram model, the evaluating comprising:
        associating a flag with the attribute of the element of the dynamic portion,
        propagating the flag backwards from the element of the dynamic portion to the graphical entity of the configuration subgraph portion using the connection,
        accessing the graphical entity of the configuration subgraph portion prior to compiling the dynamic portion, and
        executing the graphical entity to configure the attribute of the element of the dynamic portion,
        the configuring based on the executing of the graphical entity in the configuration subgraph portion, and
        the configuring performed prior to executing the dynamic portion of the model; and
      execute the dynamic portion of the block diagram model, the dynamic portion of the block diagram model having the configured attribute of the element.

11. The media of claim 10, further storing:
    one or more instructions that, when executed by the processing logic, cause the processing logic to:
      generate code for the dynamic portion of the block diagram model, wherein the code includes code for configuring the attribute in the element.

12. The media of claim 10, wherein the attribute is a parameter and wherein the media further stores:
    one or more instructions that, when executed by the processing logic, cause the processing logic to:

setting a value of the parameter based on the result of the evaluating.

13. The media of claim 10, wherein the element includes an attribute port and wherein the media further stores:
one or more instructions that, when executed by the processing logic, cause the processing logic to:
establish the connection between the configuration subgraph portion and the attribute port.

14. The media of claim 10, further storing:
one or more instructions that, when executed by the processing logic, cause the processing logic to:
display the configuration subgraph portion differently than the dynamic portion of the block diagram model, and
indicate that the configuration subgraph portion is not executed during an execution of the dynamic portion of the block diagram model, the indicating based on the displaying.

15. The media of claim 10, further storing:
one or more instructions that, when executed by the processing logic, cause the processing logic to:
omit displaying the configuration subgraph portion during an execution of the dynamic portion of the block diagram model.

16. The media of claim 10, further storing:
one or more instructions that, when executed by the processing logic, cause the processing logic to:
propagate the attribute to a second element of the dynamic portion of the block diagram model.

17. A system comprising:
processing logic for:
accessing a block diagram model, the block diagram model:
having a dynamic portion, the dynamic portion associated with an element having an attribute, and
having a configuration subgraph portion with a graphical entity for configuring the attribute of the element of the dynamic portion, the configuration subgraph portion being directly or indirectly connected to the dynamic portion through a connection;
evaluating the configuration subgraph portion of the block diagram model, the evaluating comprising:
associating a flag with the attribute of the element of the dynamic portion,
propagating the flag backwards from the element of the dynamic portion to the graphical entity of the configuration subgraph portion using the connection,
accessing the graphical entity of the configuration subgraph portion prior to compiling the dynamic portion, and
executing the graphical entity to configure the attribute of the element of the dynamic portion,
the configuring based on the executing of the graphical entity in the configuration subgraph portion, and
the configuring performed prior to executing the dynamic portion of the model; and
executing the dynamic portion of the block diagram model, the dynamic portion of the block diagram model having the configured attribute of the element.

18. The system of claim 17, further comprising:
a display,
wherein the processing logic further:
displays, on the display, the configuration subgraph portion differently than the dynamic portion of the block diagram model; and
indicating that the configuration subgraph portion is not executed when the dynamic portion of the block diagram model is executed, the indicating based on the displaying.

19. The method of claim 1, wherein the evaluating further comprises:
propagating the flag through the configuration subgraph portion to a source in the configuration subgraph portion, the source providing a signal for configuring the attribute of the element,
accessing a list of blocks in the configuration portion, the list of blocks comprising the graphical entity, and
performing one or more operations on the blocks in the list, the one or more operations comprising at least one of:
a source/destination analysis,
identifying one or more configuration attributes associated with one or more of the blocks in the list,
a complexity propagation,
a buffer allocation, and
block sorting.

* * * * *